(12) United States Patent
Tsuda et al.

(10) Patent No.: US 10,710,269 B2
(45) Date of Patent: *Jul. 14, 2020

(54) BLADE GUARD WITH DUST COLLECTION

(71) Applicant: SawStop Holding, LLC, Tualatin, OR (US)

(72) Inventors: Hollan A. Tsuda, Corvallis, OR (US);
John P. Nenadic, Camas, WA (US);
Paul H. Stasiewicz, Oregon City, OR (US)

(73) Assignee: SawStop Holding LLC, Tualatin, OR (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/450,132

(22) Filed: Mar. 6, 2017

(65) Prior Publication Data

US 2017/0173818 A1  Jun. 22, 2017

Related U.S. Application Data

(63) Continuation of application No. 12/931,208, filed on Jan. 27, 2011, now Pat. No. 9,586,335.

(60) Provisional application No. 61/336,927, filed on Jan. 27, 2010.

(51) Int. Cl.
*B27G 19/02* (2006.01)
*B23D 59/00* (2006.01)
*B23Q 11/00* (2006.01)

(52) U.S. Cl.
CPC ........... *B27G 19/02* (2013.01); *B23D 59/006* (2013.01); *B23Q 11/0042* (2013.01); *B23Q 11/0046* (2013.01); *Y02P 70/171* (2015.11); *Y10T 83/207* (2015.04); *Y10T 83/2077* (2015.04); *Y10T 83/2198* (2015.04); *Y10T 83/2209* (2015.04)

(58) Field of Classification Search
CPC ................ B27G 19/02; B23Q 11/0046; B23Q 11/0042; B23D 59/006; Y02P 70/171; Y10T 83/2077; Y10T 83/2209; Y10T 83/2198; Y10T 83/207

See application file for complete search history.

(56) References Cited

U.S. PATENT DOCUMENTS

| 1,552,553 | A |   | 9/1925 | Georgia |   |
|---|---|---|---|---|---|
| 1,830,151 | A | * | 11/1931 | Wilderson | B23D 59/006 144/252.1 |
| 2,203,088 | A | * | 6/1940 | Helge | A47L 9/06 15/326 |
| 2,257,459 | A | * | 9/1941 | Gardner | B27G 19/08 83/102.1 |

(Continued)

FOREIGN PATENT DOCUMENTS

| AT | 397786 B | * | 6/1994 | ............ B27G 19/02 |
| DE | 8807584 |   | 9/1988 | |

(Continued)

*Primary Examiner* — Jonathan G Riley

(57) ABSTRACT

Blade guards for power tools such as table saws are disclosed. The blade guard may include a shroud that pivots up and down to allow a workpiece to move past the guard, a dust collection channel, and a pivot joint which maintains the dust collection channel in an operable condition as the shroud pivots up or down. The guard may also include a wood stop and anti-kickback pawls. The blade guard may be part of a dust collection system and may be connected to a vacuum system by a conduit such as a flexible hose.

4 Claims, 28 Drawing Sheets

(56) References Cited

U.S. PATENT DOCUMENTS

| | | | |
|---|---|---|---|
| 2,593,596 A * | 4/1952 | Olson | B27G 19/02 83/102.1 |
| 2,823,711 A * | 2/1958 | Kaley | B23D 59/006 144/253.1 |
| 4,241,505 A * | 12/1980 | Bodycomb, Jr. | B23D 59/006 144/252.1 |
| 4,576,072 A * | 3/1986 | Terpstra | B23D 47/025 83/100 |
| 4,875,398 A * | 10/1989 | Taylor | B23D 59/006 83/100 |
| 5,116,249 A | 5/1992 | Shiotani et al. | |
| 5,230,269 A | 7/1993 | Shiotani et al. | |
| 5,287,779 A * | 2/1994 | Metzger, Jr. | B23D 45/025 83/102.1 |
| 5,353,670 A * | 10/1994 | Metzger, Jr. | B27G 19/02 83/471.3 |
| 5,857,507 A | 1/1999 | Puzio et al. | |
| 5,927,171 A * | 7/1999 | Sasaki | B23D 59/006 83/100 |
| 6,131,629 A | 10/2000 | Puzio et al. | |
| 6,219,922 B1 * | 4/2001 | Campbell | B23D 59/006 30/124 |
| 6,482,252 B1 | 11/2002 | Conrad et al. | |
| 6,519,810 B2 * | 2/2003 | Kim | A47L 9/02 15/331 |
| 6,796,208 B1 | 9/2004 | Jorgensen | |
| 7,000,515 B2 | 2/2006 | Jorgensen | |
| 7,194,784 B2 * | 3/2007 | Overvaag | A47L 9/327 15/327.1 |
| 7,458,301 B2 | 12/2008 | Yu | |
| 7,850,209 B2 * | 12/2010 | Lutzer | F16L 27/12 285/263 |
| 8,082,825 B2 | 12/2011 | Butler | |
| 2002/0134464 A1 * | 9/2002 | Altendorf | B23D 59/001 144/251.1 |
| 2004/0200329 A1 * | 10/2004 | Sako | B23D 59/001 83/58 |
| 2010/0307307 A1 * | 12/2010 | Butler | B23D 59/006 83/58 |
| 2011/0023674 A1 * | 2/2011 | Stasiewicz | B23D 59/006 83/112 |
| 2012/0090440 A1 * | 4/2012 | Koegel | B23D 59/006 83/100 |
| 2012/0222534 A1 * | 9/2012 | Samprathi | B23D 45/062 83/471.3 |

FOREIGN PATENT DOCUMENTS

| | | | |
|---|---|---|---|
| DE | 4205965 C1 | 2/1992 | |
| DE | 9306198 | 4/1993 | |
| EP | 1925388 A1 * | 5/2008 | B23D 45/06 |

* cited by examiner

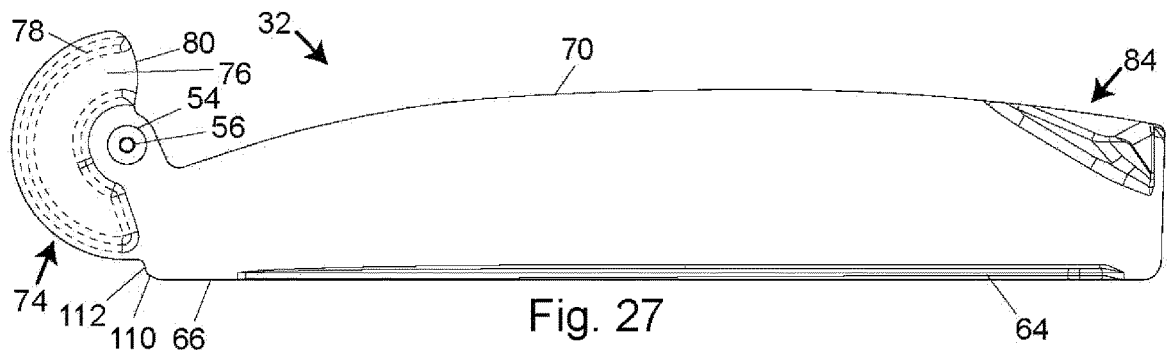
Fig. 27
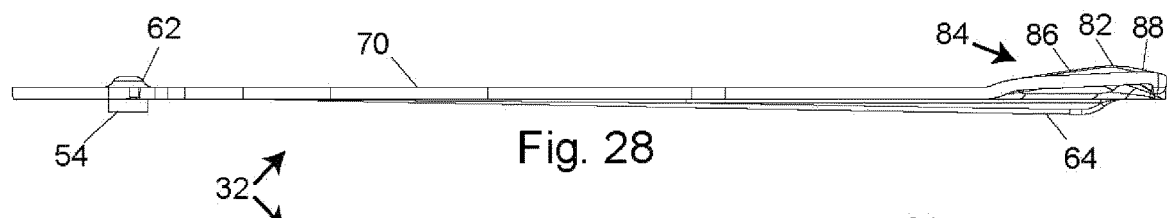
Fig. 28
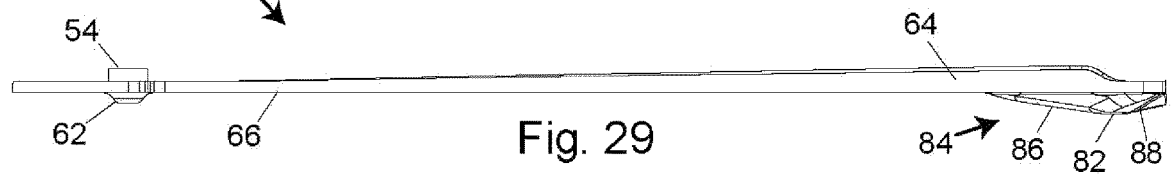
Fig. 29
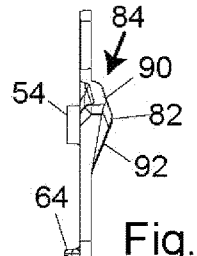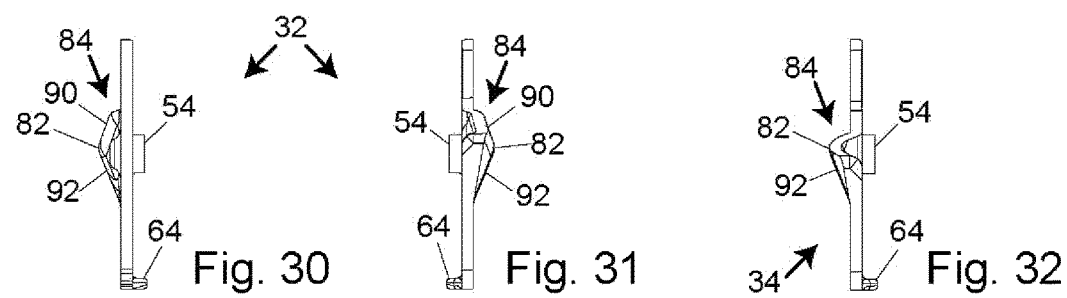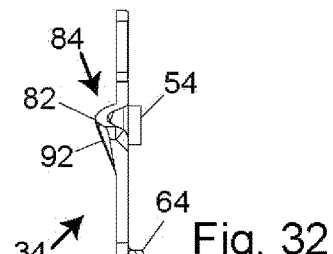
Fig. 30   Fig. 31   Fig. 32
Fig. 33
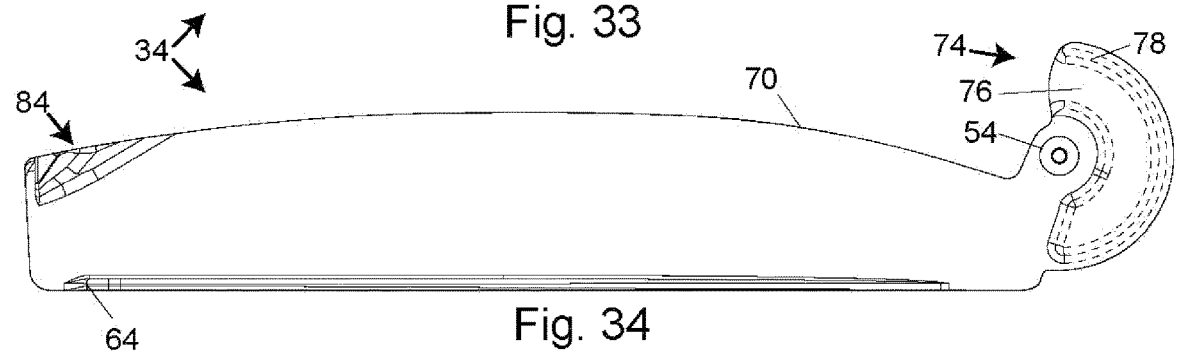
Fig. 34

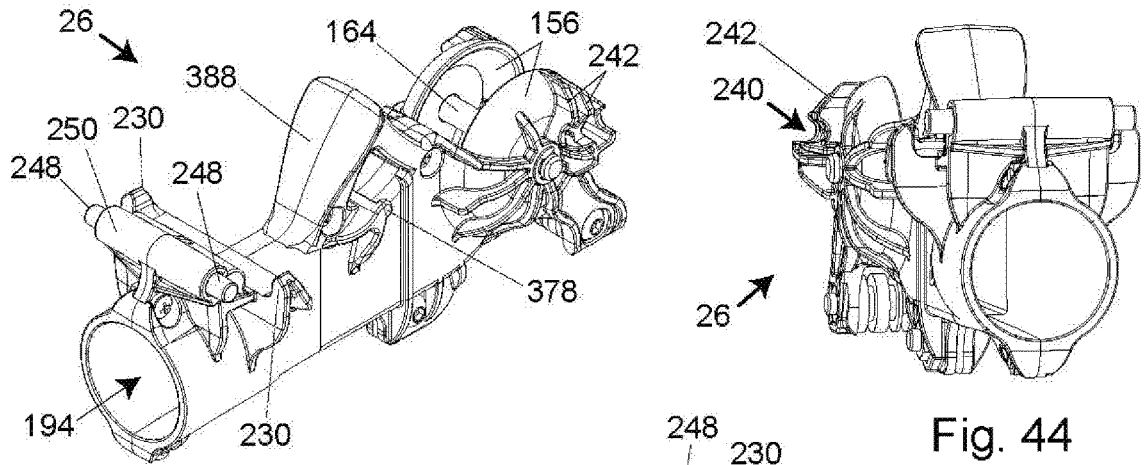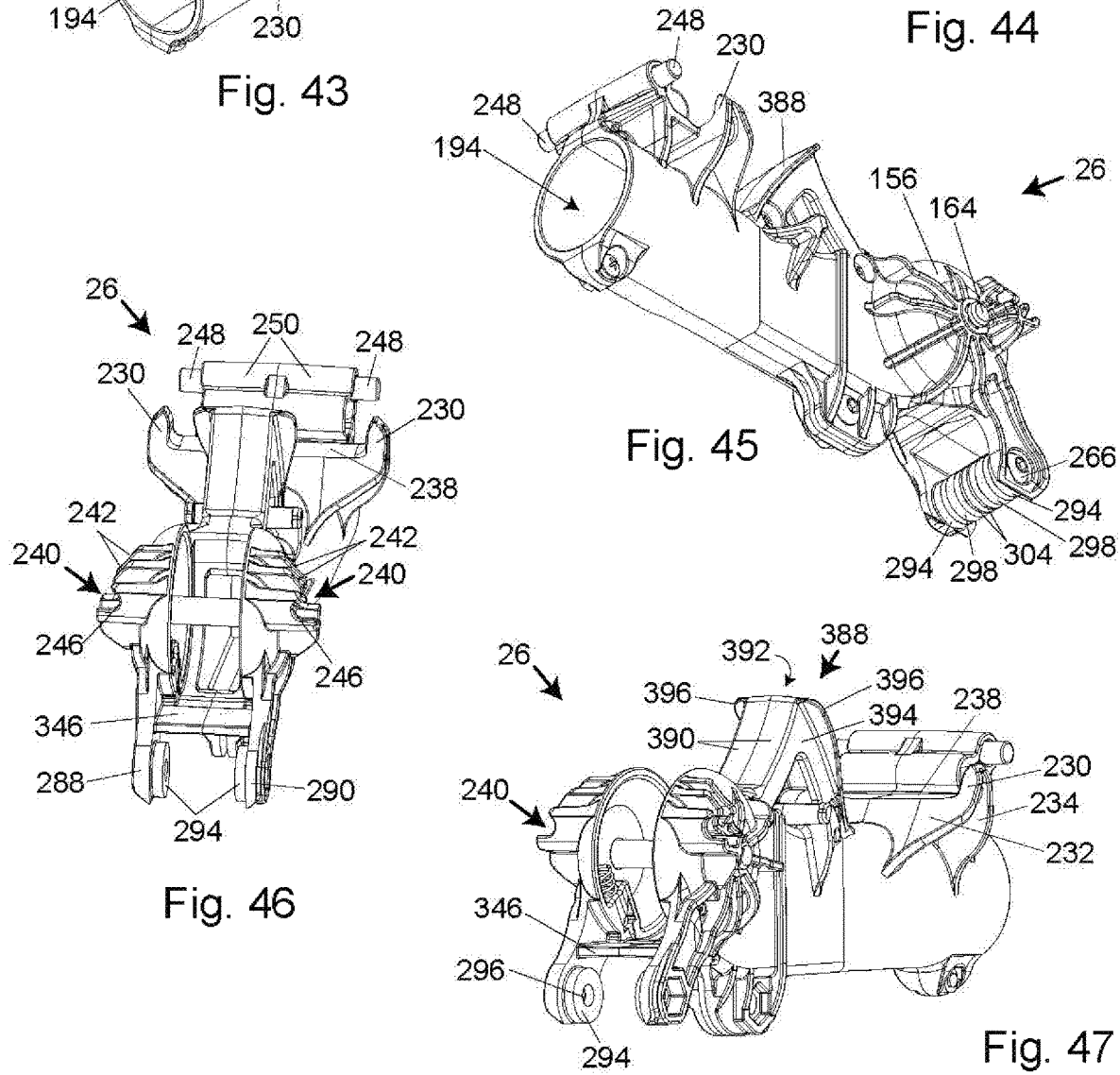

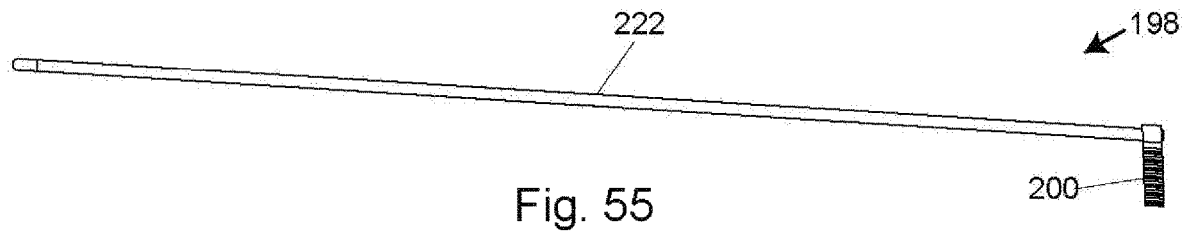
Fig. 55
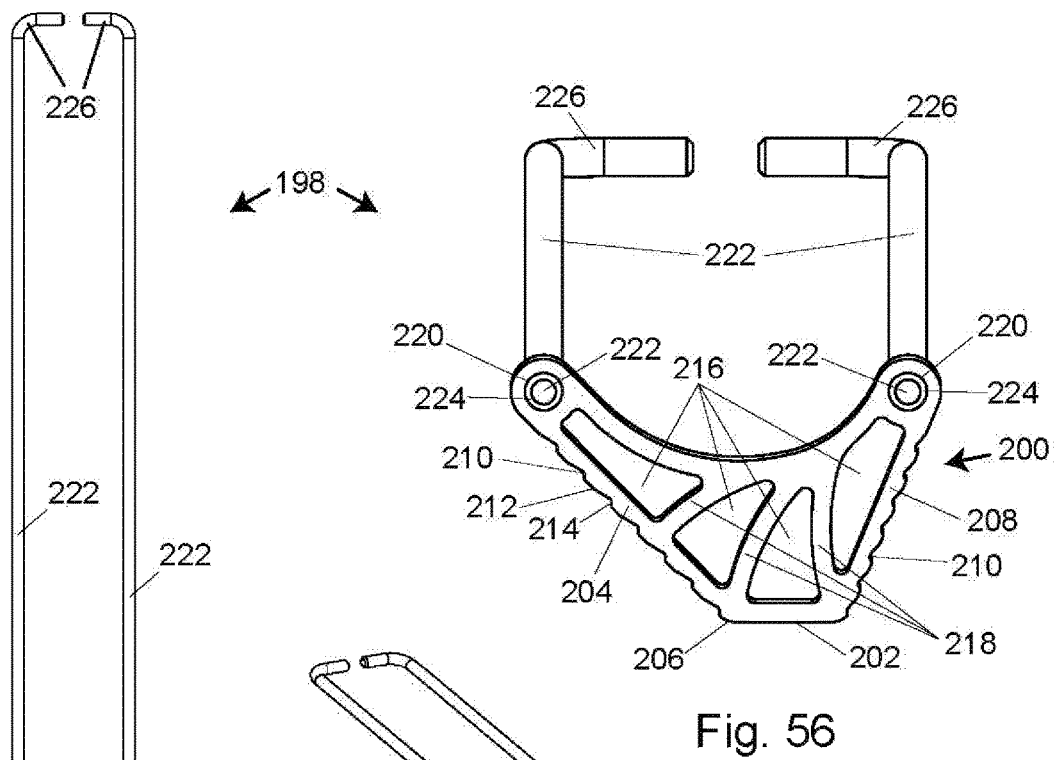
Fig. 56
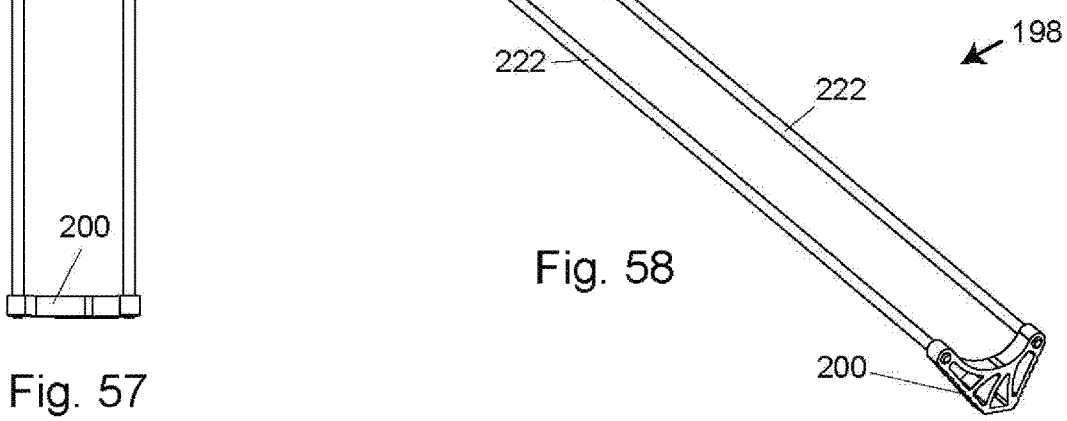
Fig. 57
Fig. 58

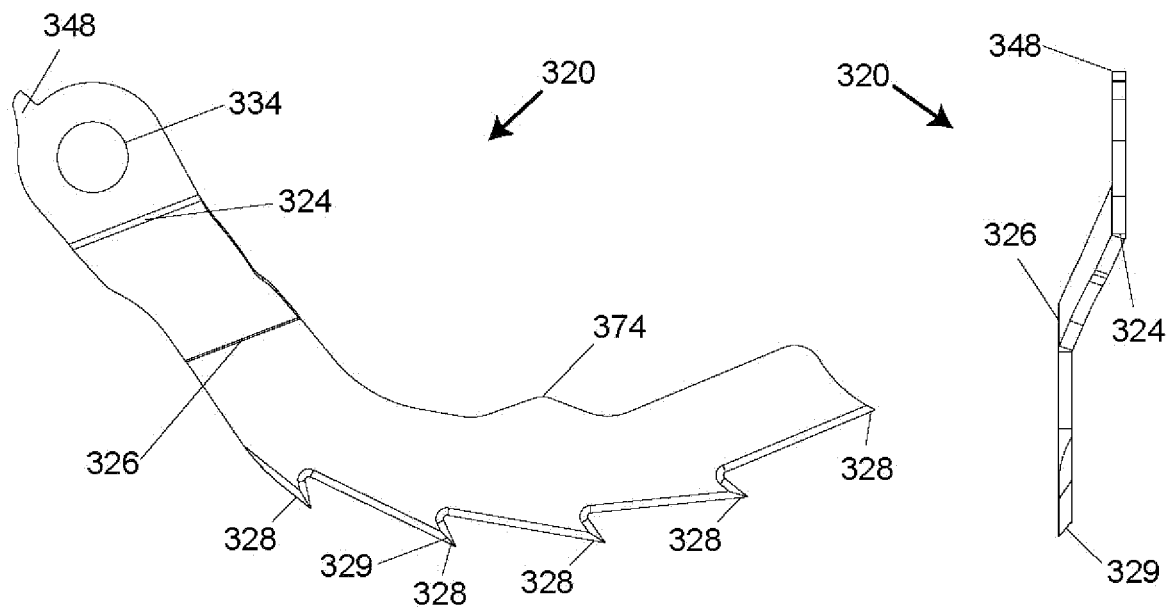
Fig. 59
Fig. 60
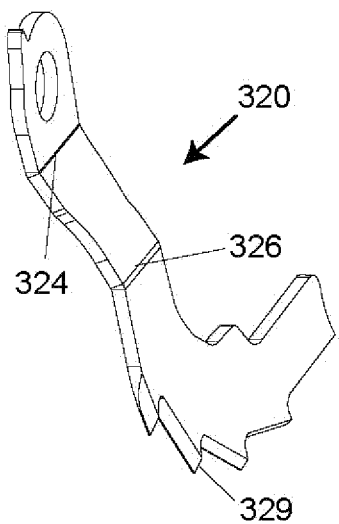
Fig. 61
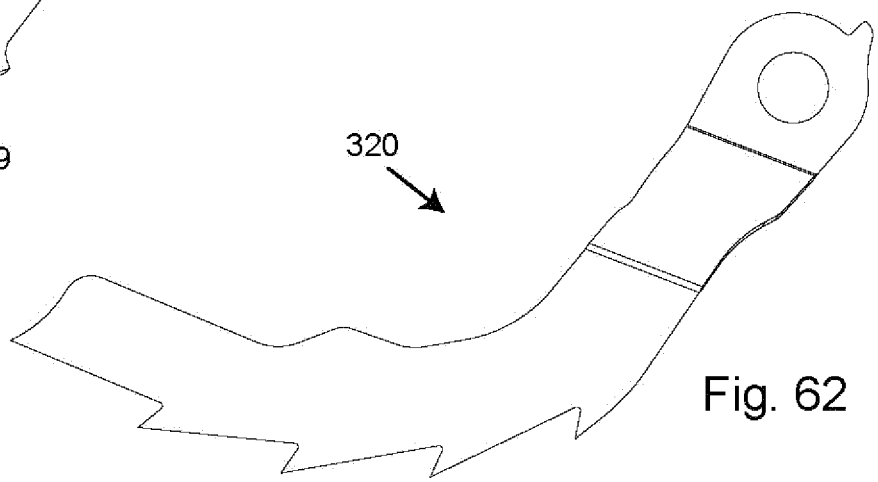
Fig. 62

BLADE GUARD WITH DUST COLLECTION

CROSS-REFERENCE TO RELATED APPLICATION

This application is a continuation of U.S. patent application Ser. No. 12/931,208, filed Jan. 27, 2011, which claims the benefit of and priority from the U.S. Provisional Patent Application Ser. No. 61/336,927, filed Jan. 27, 2010, the disclosures of which are herein incorporated by reference.

TECHNICAL FIELD

The present specification describes blade guards for power tools such as table saws. More specifically, the specification relates to blade guards with dust collections systems, splitters, and anti-kickback devices.

BACKGROUND

A table saw is a power tool used to cut a workpiece to a desired size or shape. A table saw includes a work surface or table and a circular blade extending up through the table. A person uses a table saw by holding a workpiece on the table and feeding it past the spinning blade to make a cut. A fair amount of sawdust is generated at the surface of a table saw as the blade cuts the workpiece and that dust can disperse into the surrounding environment. Dust from wood and many other products commonly processed in a workshop environment have been shown to pose a health risk to those who are exposed to the dust, especially if exposed to the dust on a regular basis. Thus, it is important to collect as much dust as possible at the time of cutting and thereby limit the dust that escapes into the environment. The blade guards disclosed in this specification include systems to collect sawdust.

The disclosed blade guards also include a shroud to substantially enclose the blade and protect against contact with the blade, a splitter or spreader to support the shroud and to keep a workpiece from shifting sideways and catching on the blade, an anti-kickback device such as a set of anti-kickback pawls configured to oppose a workpiece being thrown back toward a user, and/or a block to prevent a workpiece that is higher than the top of the blade from contacting the spinning blade.

BRIEF DESCRIPTION OF DRAWINGS

FIG. 27 shows a side view of the right side extension.
FIG. 28 shows a top view of the right side extension.
FIG. 29 shows a bottom view of the right side extension.
FIG. 30 shows a front view of the right side extension.
FIG. 31 shows a rear view of the right side extension.
FIG. 32 shows a rear view of the left side extension of the blade shroud.
FIG. 33 shows a top view of the left side extension.
FIG. 34 shows a side view of the left side extension.
FIG. 43 shows a perspective view of the dust port of the blade guard.
FIG. 44 shows another perspective view of the dust port of the blade guard.
FIG. 45 shows another perspective view of the dust port of the blade guard.
FIG. 46 shows another perspective view of the dust port of the blade guard.
FIG. 47 shows another perspective view of the dust port of the blade guard.

FIG. 55 shows a side view of the limit rod of the blade guard.

FIG. 56 shows the front of the wood stop on the limit rod of FIG. 55.

FIG. 57 shows a top view of the limit rod of FIG. 55.

FIG. 58 shows a perspective view of the limit rod of FIG. 55.

FIG. 59 shows a right anti-kickback pawl.

FIG. 60 shows another view of a right anti-kickback pawl.

FIG. 61 shows still another view of an anti-kickback pawl.

FIG. 62 shows a side view of an anti-kickback pawl.

DETAILED DESCRIPTION

Figure 1:
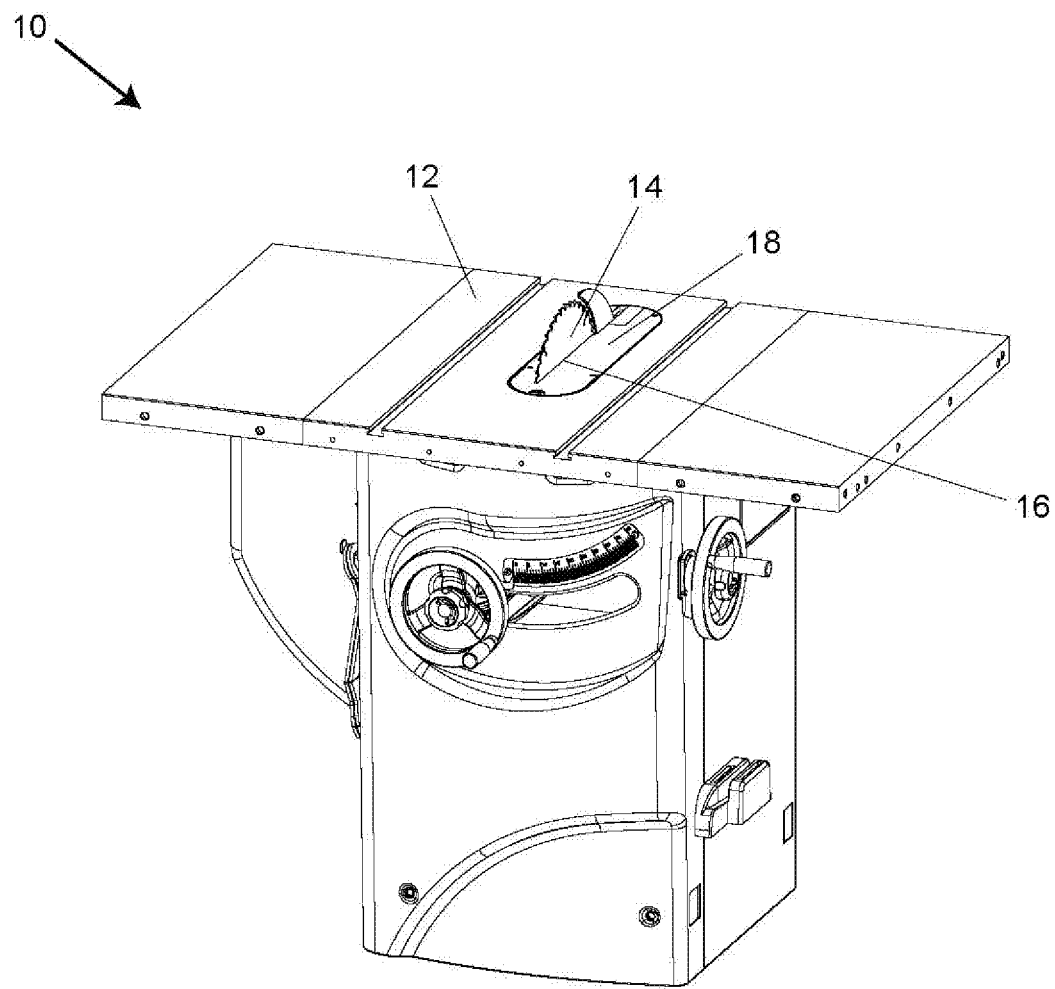
FIG. 1 shows a table saw.

A table saw is shown at 10 in FIG. 1. Saw 10 includes a table 12 and a circular blade 14 that extends up through a slot 16 in a table insert 18 that fits within an opening in the table. A piece of wood, or other material to be cut, is placed on the table and pushed into contact with the spinning blade to make a cut.

Figure 2:
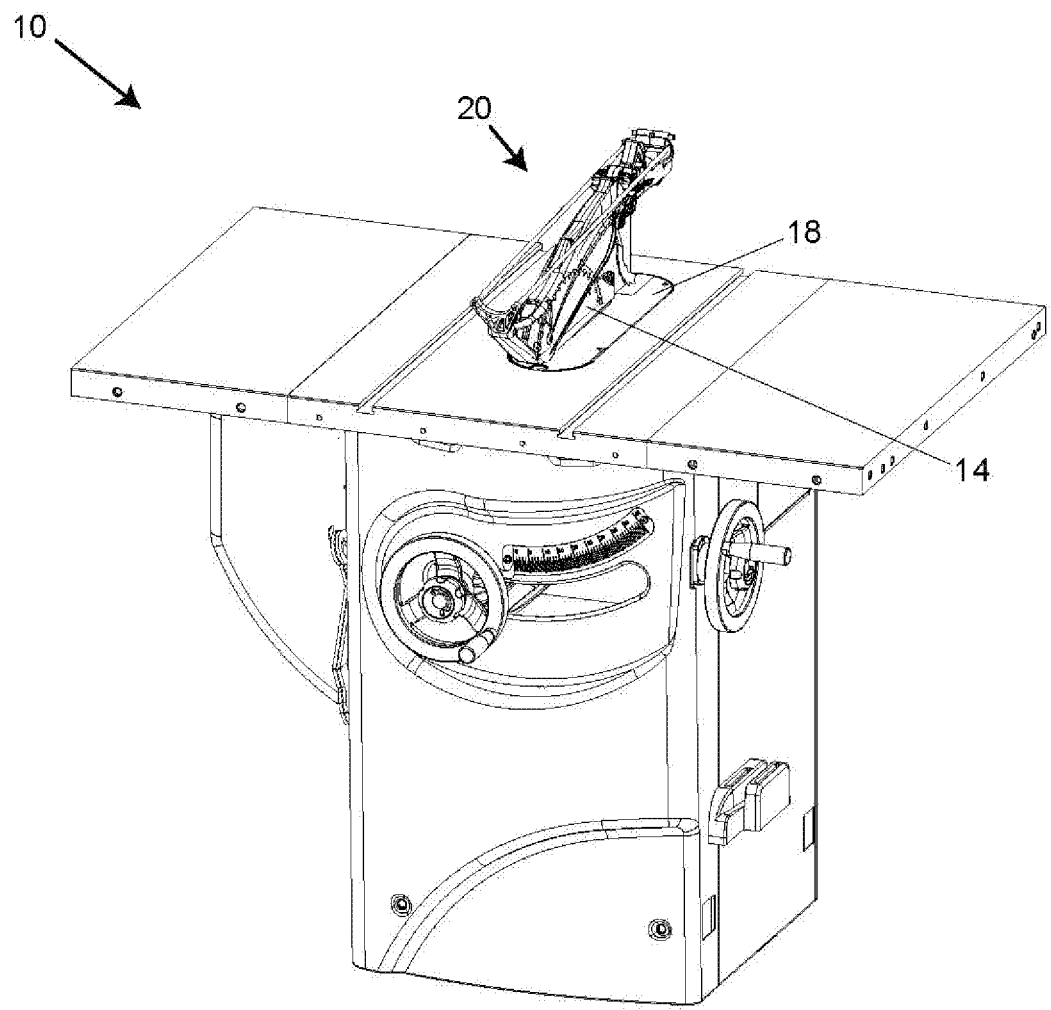
FIG. 2 shows the table saw of FIG. 1 equipped with a blade guard.
Figure 3:
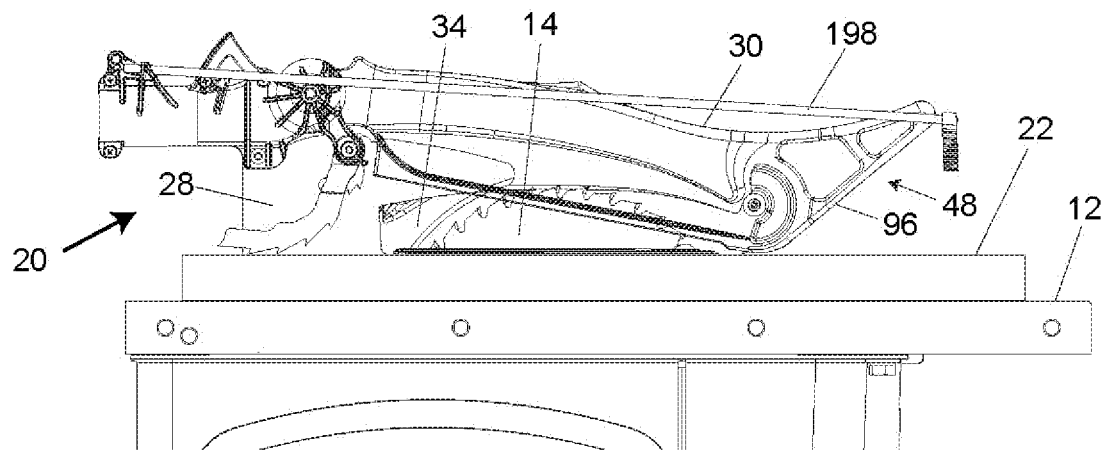
FIG. 3 shows a side view of the blade guard of FIG. 2 installed in the table saw of FIG. 1 with the blade elevated and a piece of wood being cut.

FIG. 2 shows the saw of FIG. 1 with a blade guard 20 installed. One of the purposes of the blade guard is to protect the user from coming into contact with the spinning blade by providing a physical barrier to block the user's hand from moving into the blade. It is an accessory used for through-sawing, i.e., where the blade cuts through the top of a workpiece, such as workpiece 22 shown in FIG. 3. Blade guard 20 is shown separate from a saw in FIG. 4. The main body of the blade guard consists of a blade shroud 24 that surrounds the blade and is pivotally attached to a dust port 26. The dust port is rigidly bolted to a splitter 28 that mounts in the saw and protrudes up through the table insert 18. In the embodiment shown in the figures, dust port 26 is mounted along a top region of the splitter at what may be thought of as a first mounting location. When the blade guard is in use, the bottom of the blade shroud 24 rests on the table insert or workpiece 22, as shown in FIGS. 2 and 3, and covers the top and sides of the blade. When not in use, the blade shroud may be pivoted to an upright position to allow easy access to the blade, as shown in FIG. 5. FIGS. 6 through 14 show various views of the blade guard.

Figure 15:
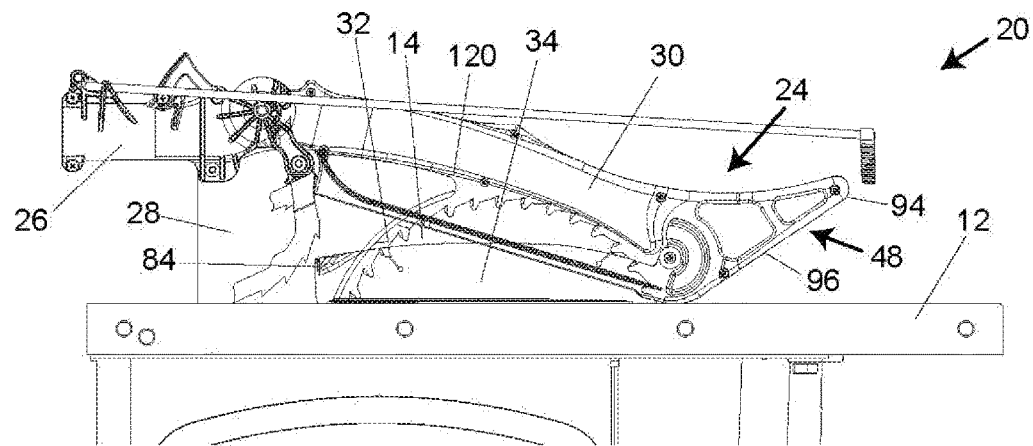
FIG. 15 shows a side view of the blade guard installed in the table saw of FIG. 1 with the blade elevated.
Figure 16:
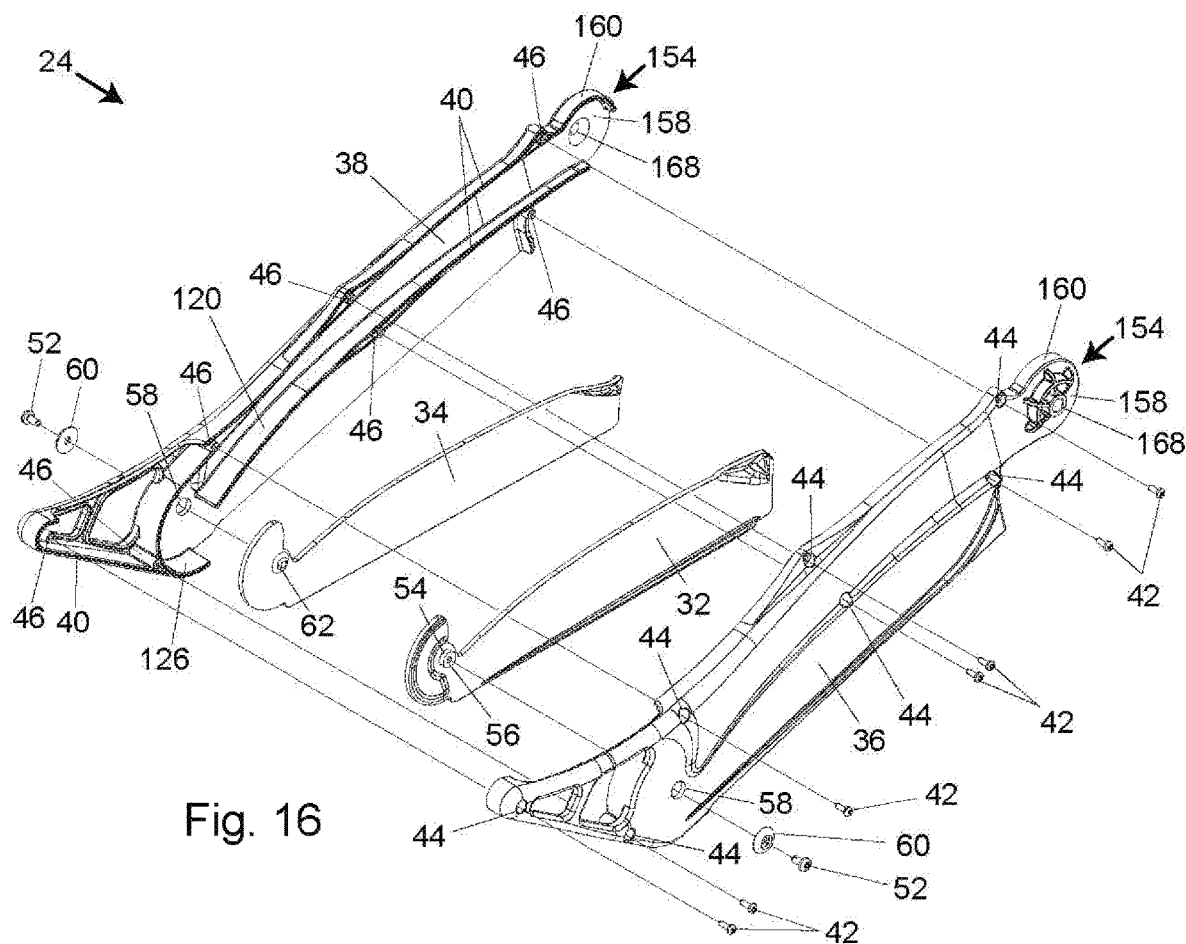
FIG. 16 shows an exploded view of the blade shroud of the blade guard.

As seen in FIGS. 15 and 16, blade shroud 24 is composed of an upper shell 30 and right and left side extensions, 32 and 34 respectively. These components are typically made of transparent polycarbonate to allow a user to see the blade through the shroud and side extensions. The upper shell covers the top and front of the blade while the side extensions provide additional coverage along the sides of the blade below the upper shell.

Figure 17:
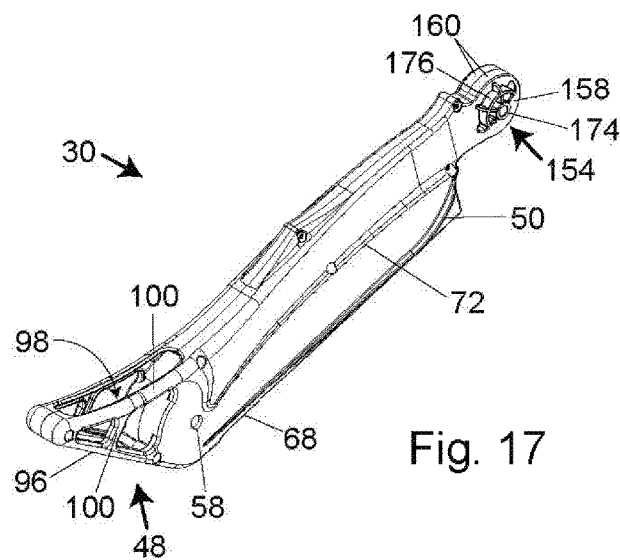
FIG. 17 shows a perspective view of the upper shell of the blade shroud.
Figures 19, 20:
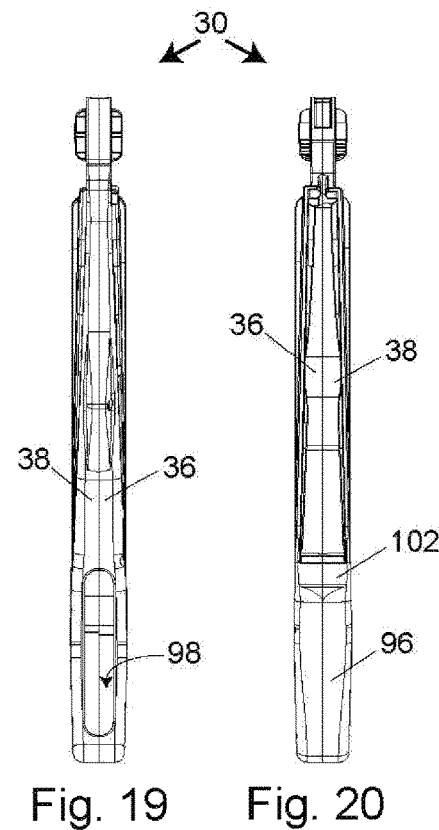
FIG. 19 shows a top view of the upper shell of the blade shroud.
FIG. 20 shows a bottom view of the upper shell of the blade shroud.
Figure 18:
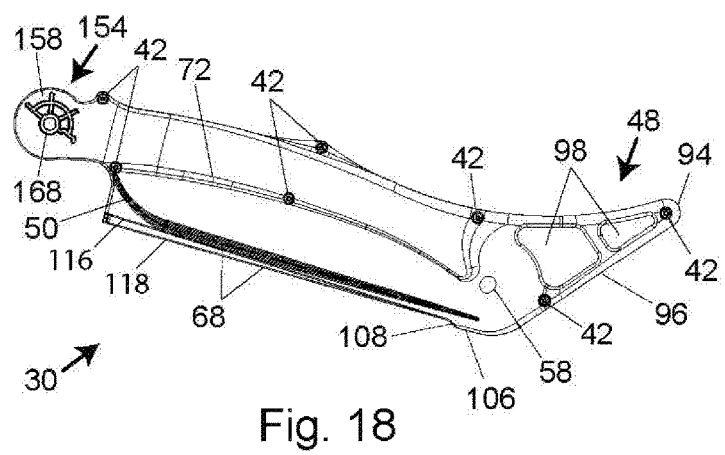
FIG. 18 shows a left side view of the upper shell of the blade shroud.
Figures 21, 22:
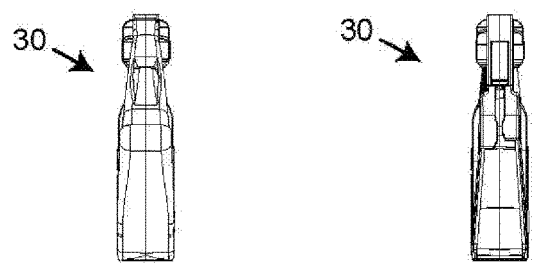
FIG. 21 shows a front view of the upper shell of the blade shroud.
FIG. 22 shows a rear view of the upper shell of the blade shroud.

FIG. 16 shows an exploded view of the blade shroud. The upper shell 30 consists of two halves 36 and 38 that fit together with tongue and groove mating 40 along their joining edges and which are fastened together with seven small, self-threading screws 42. Each screw passes through a boss 44 in the right half 36, which catches the head of the screw at the bottom of the boss, and then threads into a narrower non-threaded boss 46 in the left half 38. Three of the screws are spread out along the length of the top surface of the upper shell, three run along the length of the blade guard shell at the middle of the upper shell and one is at the nose 48 of the blade guard. Nose 48 extends out from the upper shell in front of the blade as shown in FIG. 15. FIGS. 17 through 23 show various views of the upper shell isolated from other structure. As seen in FIG. 17, the upper shell is wider at the nose and tapers inwards moving towards the rear to allow clearance for other parts of the blade guard near the rear of the blade guard. The wider nose helps prevent the blade guard from hitting the blade if bumped from the side. This is particularly important when the blade and blade guard are tilted at 45 degrees relative to the table because in that position the blade guard has a greater tendency to deflect inward or toward the blade. As shown in FIG. 18, a ridge 50 runs along the upper shell near the bottom edge and curls up the side of each upper shell half near the rear to make the upper shell stronger.

Figure 24:
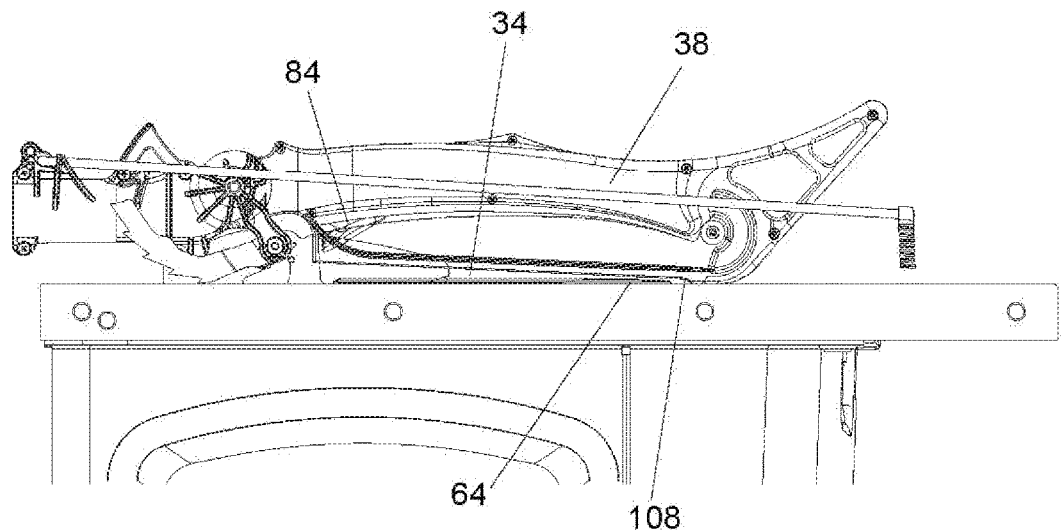
FIG. 24 shows a side view of the blade guard installed in the table saw of FIG. 1 with the blade lowered.

Side extensions 32 and 34 are flat (or planar), generally rectangular shaped pieces attached to the upper shell in such a way that they are free to pivot up and down individually. To allow the side extensions to pivot, two self-threading screws 52, one for each side extension, attach the front end of a side extension to the front end of an upper shell half near the nose. As shown in FIGS. 16, 27 and 34, each side extension has a circular raised region 54 toward the front end and on the outward-facing side, and the circular region has a hole 56 in the center about which the side extension pivots. The circular raised region 54 fits within a corresponding oval hole 58 in each upper shell half. A screw 52 passes through a polycarbonate finish washer 60, then through the hole 56 in the side extension and threads into a boss 62 (which in the illustrated embodiment is continuous with raised region 54) that extends inward from the inner side of the side extension, as shown in FIGS. 16, 26, 28 and 29. When the blade is lowered, the blade guard moves down with the blade and the side extensions contact the table or workpiece and pivot upward about screws 52, as shown by the position of the side extensions in FIG. 24. The side extensions fit within the side walls of the upper shell such that when the side extensions are pivoted upwards fully, a flange 64 along the bottom edge 66 of each side extension runs along and underneath the bottom edges 68 of the upper shell, and the top edges 70 of the side extensions follow along and just below a contour 72 that projects outward along the middle of the outer surface of the upper shell. The upper shell is wider in the area where the side extensions reside so that they are kept away from the blade. When the blade is fully raised, the side extensions pivot downward under gravity so that the bottom edges 66 of the side extensions remain horizontal on the surface of the table insert or workpiece, as shown in FIG. 3. The side extensions help cover the sides of the blade left exposed as the back end of the upper shell rises.

Figure 25:
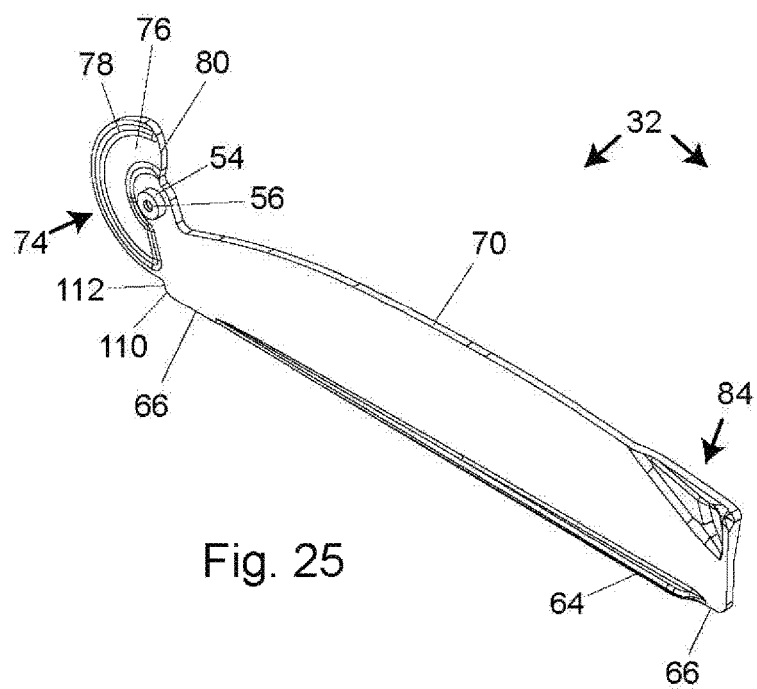
FIG. 25 shows a perspective view of the right side extension of the blade shroud of FIG. 16.
Figure 26:
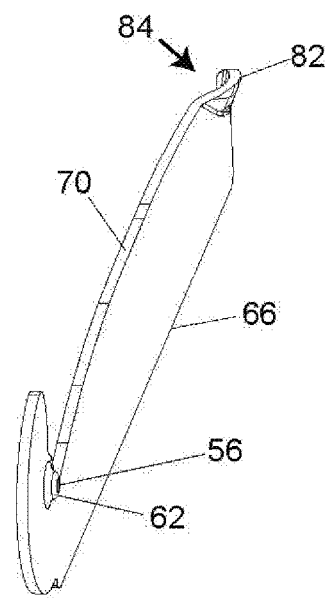
FIG. 26 shows another perspective view of the right side extension.

FIGS. 25 through 34 show various views of the side extensions isolated from other structure. As shown in FIGS. 27 and 34, the front end 74 of each side extension is shaped like a semicircle that is taller than the rest of the side extension. These semicircular ends 74 extend radially outward from the point about which the side extensions pivot in order to restrict the sideways movement of the side extensions so that they do not flex inward and contact the blade. The middle area of the semi-circular ends between the outer edge and the outskirts of hole 56 is recessed on the outward-facing side (i.e., the side which faces the inside wall of the upper shell). The recessed area 76 helps reduce friction as the side extensions pivot up and down. Each recessed area is surrounded by a border 78 that runs along the outside edge of the semi-circular region and in front of hole 56 and gradually tapers into the thickness of the side extension to create the recessed area, as seen in FIG. 25. There is an opening 80 in the border for one short segment along the upper rear of the semi-circular end. The opening 80 allows dust that may accumulate in the recessed area to escape.

As shown in at least FIGS. 25 through 34, the tip 82 of a triangularly shaped molded protrusion 84 at the upper, rear corner of each side extension, is positioned to slide along the splitter when the side extensions pivot up or down, thereby helping to keep the side extensions from moving inward and contacting the blade. The triangle 84 is positioned back far enough on each side extension so as not to hit the teeth of the blade. As shown in FIG. 28, the front and back of triangle 84 have sloped surfaces 86 and 88 that meet at the tip 82. In addition, triangle 84 has surfaces 90 and 92 that slope down from the top and up from the bottom respectively and which meet the front and back sloped surfaces 86 and 88 to form tip 82, as shown in FIGS. 30 and 31. Tip 82 is not sharp but smooth and flattened. The sloped sides of the triangles are shaped in such a way as to keep the triangles on each side extension from catching on each other or on the splitter when the side extensions pass by each other or when they pass by the top of the splitter as they pivot up and down.

As mentioned earlier, a flange 64 lies along the bottom of each side extension. The flange tapers outward from the front of the blade guard towards the rear. The flange provides strength and also helps keep the side extension from bowing or flexing inward.

Figure 23:
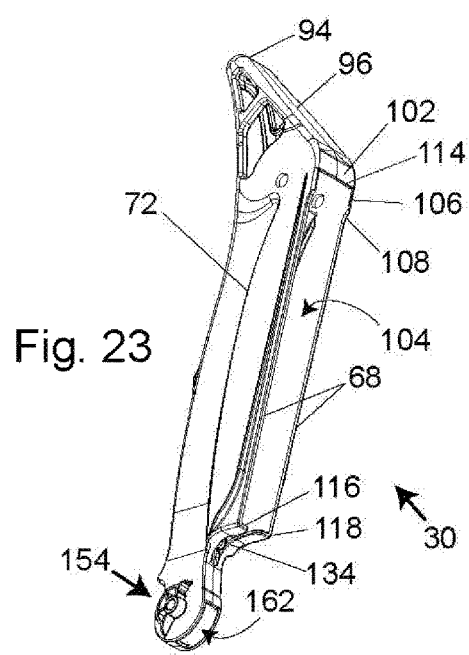
FIG. 23 shows a perspective view of the bottom of the upper shell of the blade shroud.

As a workpiece is moved towards the blade with the blade guard in place, the workpiece first encounters the nose 48 of the upper shell. The nose 48 is shaped in such a way that the workpiece can easily slide under the nose and raise the blade shroud as it slides under. The nose of the blade guard includes a tip 94 and a surface 96 that slopes down from the tip toward the blade at an angle, as shown in FIGS. 15, 18 and 23, so that as the workpiece contacts the sloped surface 96 it pushes the nose up as the workpiece moves towards the blade. The height of the nose is determined by the maximum height of a workpiece to be cut with the blade guard installed. This, in turn, is determined by the maximum height of the blade. Given the height of the nose, the length of the nose is a compromise between keeping the nose short and creating a slope that enables the workpiece to smoothly engage the nose and lift the guard. The less steep the slope, the longer the nose and the more smoothly the workpiece engages the blade guard. Sloped surface 96 at the front of the nose curves to join a bottom surface 102 of the upper shell. With this configuration, bottom surface 102 maintains contact with the top surface of the table insert or with the top surface of the workpiece as the upper shell pivots.

When the blade is fully lowered, or when the workpiece has a maximum thickness, the upper shell is pivoted such that the bottom edge 68 of the upper shell is nearly horizontal relative to the table or workpiece, and bottom surface 102 rests on the table or workpiece. Bottom surface 102 continues for a short distance and then ends, leaving the bottom of the upper shell open, as shown at 104 in FIG. 23. The bottom edges 68 of the sides of the upper shell continue towards the rear of the blade guard for a short distance after bottom surface 102 ends, as shown at 106 in FIG. 23, and then each side curves upward, as shown at 108 in FIGS. 18, 23 and 24, just enough to make room for the flanges 64 that run along the bottom edges of each side extension.

As shown in FIGS. 17 and 18, the nose of the upper shell includes cutouts 98 on the side and top areas to allow the user to see the blade more clearly, especially as the workpiece contacts the blade. The cutouts also make the nose of the guard lighter and thus easier to lift, which is important when the blade is tilted at forty-five degrees and the wood approaches the blade at a forty-five degree miter gauge angle. A heavy nose in this situation could possibly cause the workpiece to bind against the blade guard. The borders 100 of the cutouts are formed by bending the material of the upper shell inward along the edges of the cutouts creating a webbed framework which adds strength to the nose. The cutouts also provide finger slots for lifting the blade.

As a workpiece slides under the nose of the blade guard, the upper shell pivots around the point where it connects to the dustport. When a workpiece slides under the nose of the blade guard and raises the upper shell, the back ends of the side extensions pivot downward under gravity to shield the sides of the blade. Oval hole 58 in the upper shell, shown in FIGS. 17 and 18, is slightly tilted forward to allow some vertical leeway for the pivot point of the side extension with regard to the upper shell. This enables the side extensions to remain horizontal and fully in contact with the surface of the workpiece as the upper shell rises. This leeway also gives the side extensions some freedom of movement to prevent a workpiece from stubbing against the front, bottom corners 110 of each side extension as the workpiece is moved toward the blade (the bottom corners are labeled in FIGS. 25 and 27). Bottom corners 110 allow clearance for the semicircular ends 74 of the side extensions to fit within the upper shell. Also to prevent stubbing, corners 110 are rounded at a radius that allows a smooth transition. The forward slanting front edges 112 of corners 110, located underneath and adjacent semicircular ends 74, abut edge 114 of the surface that wraps under the blade guard nose (edge 114 is labeled in FIG. 23) to limit the downward pivoting of the side extensions.

When the blade tilts to the left, the blade guard also tilts to the left. To keep both side extensions of the blade guard in contact with the table insert or workpiece as much as possible, the bottom edge of the left half of upper shell 38 is higher than the bottom edge of the right half. In other words, the left half of the upper shell gradually becomes shorter moving to the rear than the right half 36, as can be seen at 116 and 118 in FIGS. 18 and 23. This provides clearance to allow the blade guard to tilt to the left while minimizing any exposure of the blade on the right side. Correspondingly, the top edge of the left side extension 34 is shorter vertically than the right side extension 32, as can be seen by comparing FIGS. 27 and 34, to allow the left side extension to pivot into the upper shell without bumping the top of the upper shell. This configuration provides better blade coverage when the blade is tilted to the left.

A dust port designed to accommodate a vacuum hose is sometimes incorporated into the blade guard to capture dust generated above the table surface during cutting operations. A dust port might extend from the blade shroud surrounding the blade and a flexible dust collection hose might be connected to the dust port. However, the weight and angle of the hose could cause the blade shroud to move out of position, possibly contacting or exposing the blade, because the blade shroud is free to pivot and is not rigid. To solve this problem, the blade guard described herein includes a dust port rigidly attached to the splitter, and a joint between the dust port and blade shroud which allows the shroud to pivot and dust in the blade guard to travel through the joint and into a vacuum or vacuum system.

Figure 35:
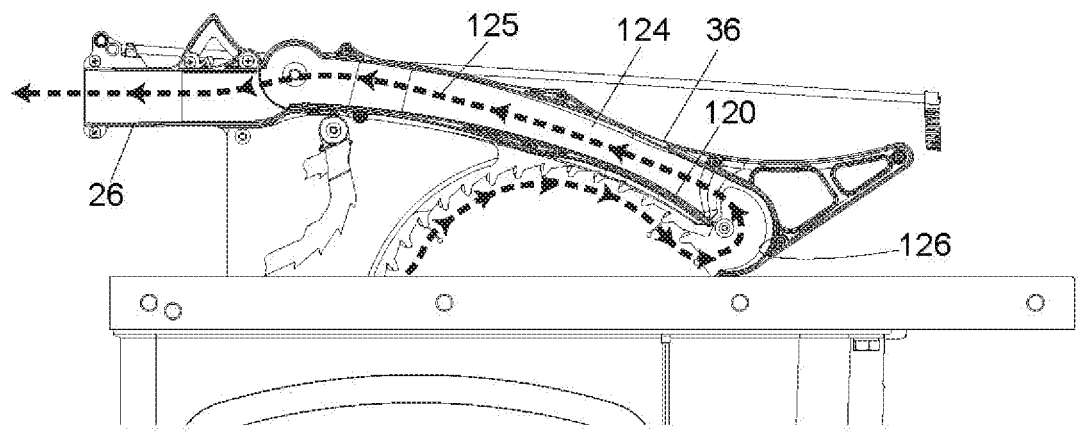
FIG. 35 shows a side view of the blade guard of FIG. 4 with the left part of the blade shroud and dust port removed, and with arrows indicating the flow of air and dust through the blade guard.
Figure 36:
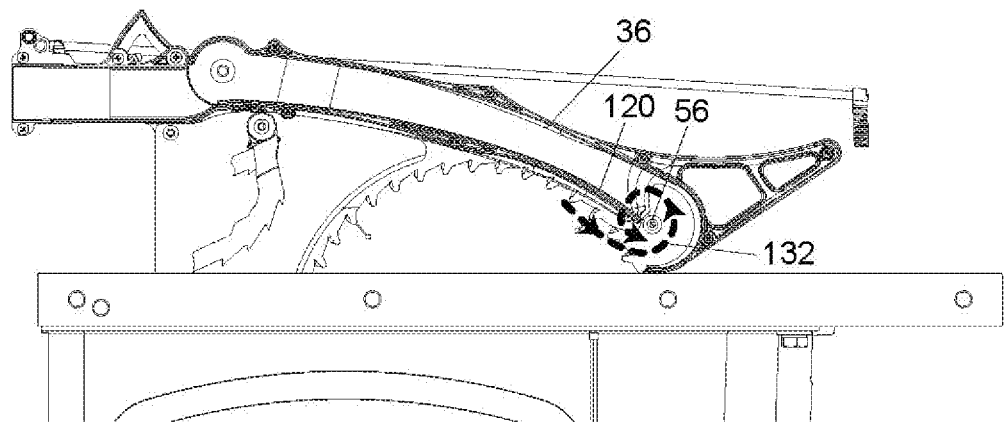
FIG. 36 shows a side view of the blade guard of FIG. 4 with the left part of the blade shroud and dust port removed and with arrows indicating an undesirable airflow pattern in the blade guard.

Blade guard 20 is designed to channel dust generated above the table surface so that the dust can be collected and removed through a dust port 26 that is rigidly supported by splitter 28. As shown in FIGS. 16, 35 and 36, the upper shell 30 includes a divider wall 120 which extends inward from each upper shell half and mates in the middle with tongue and groove edges. The divider wall is positioned such that it runs along and slightly over the top of the blade and splitter. The divider wall extends from the rear of the upper shell towards the nose, and ends just before the point where the side extensions are attached to the upper shell. The divider wall creates a dust channel 124, labeled in FIG. 35. The dust channel can be thought of as beginning below divider wall 120 at the back of the blade and extending towards the nose at the front of the blade guard. The channel then wraps upward and turns back above the dividing wall and extends toward the splitter. FIG. 35 includes a dashed line 125 that illustrates how dust can move through the channel from the rear of the blade toward the front, and then back toward the splitter and through dust port 26.

At the front of the blade guard, channel 124 curves up and back toward the splitter by a bend 126, labeled in FIGS. 16 and 35. Surface 102 at the bottom of the nose, in combination with a zero-clearance table insert 18, peels or scrapes from the blade the air that the blade puts into motion and bend 126 redirects the air up into the dust channel above the divider wall. With the blade at or near full height, the blade tends to move air down toward the table. In that case, experimentation has shown that surface 102 is optimally positioned 10 mm or less from the forward edge of the blade. When the blade is just slightly above the table, the blade directs air forward, into bend 126. The radius of curvature of bend 126 is chosen to create a cross-sectional area optimized to catch the air flow generated by the blade. A cross-sectional area that is too small will constrict the airflow. If dividing wall 120 ends farther back from the nose, making the cross-sectional area within bend 126 larger, curls are created in the airflow pattern which carry or re-circulate dust back down and which prevent or hinder dust from moving along the dust channel toward dust port 26. FIG. 36 shows a dashed arrow 132 which represents such a curling airflow pattern.

An important part of the design is the position of the end of the dividing wall relative to the center of the curvature of bend 126. For optimal air flow into and around the bend, the dividing wall ends at a point below the center of curvature so that the air strikes the dividing wall at an angle that deflects the air and dust upward, around the bend and through channel 124. If the dividing wall ended at a point higher or equal to the vertical position to the center of curvature of bend 126, air could strike the dividing wall and be deflected downward toward the table.

The dust channel above the dividing wall can be sized generally to maintain the optimized cross-sectional area of bend 126 along its length. Alternatively, the cross-sectional area may be varied to move the air faster or slower in one or more parts with a corresponding variation in airflow resistance. The channel may change shape over its length. In the depicted embodiment, the cross-sectional area of the dust channel at bend 126 is approximately 850 mm$^2$, it decreases to approximately 400 mm$^2$ adjacent the pivot joint, and then returns to approximately 850 mm$^2$ at the end of the dust outlet.

Below divider wall 120 the upper shell and side extensions closely surround the blade, substantially trapping a volume of air which is then pushed forward by the spinning blade. The side extensions play a significant role in trapping the air because they cover the sides of the blade. A large percentage of the airflow through the dust channel would be lost without the side extensions containing and directing the airflow. For air to flow through the blade guard, replacement air enters the blade guard from the rear and up through the slot in the zero-clearance table insert near the splitter. When the blade is raised, the blade moves a larger volume of air that is trapped in the blade guard and thus a larger volume of air flows into the channel. In this case, air enters at the rear of the blade guard below the dividing wall and also through the gaps along the side of the blade between the upper blade guard shell and the side extensions and also through the slot in the zero-clearance insert. When the blade is lowered, more air enters the blade guard by coming up though the slot in the table insert, but the side extensions inhibit air from entering the guard along the side of the blade so the blade guard shell includes a cutout 134 at the back below the divider wall, as shown in FIG. 23, to allow whatever additional air is needed to enter the guard and keep the dust moving along the dust channel.

Figure 37:
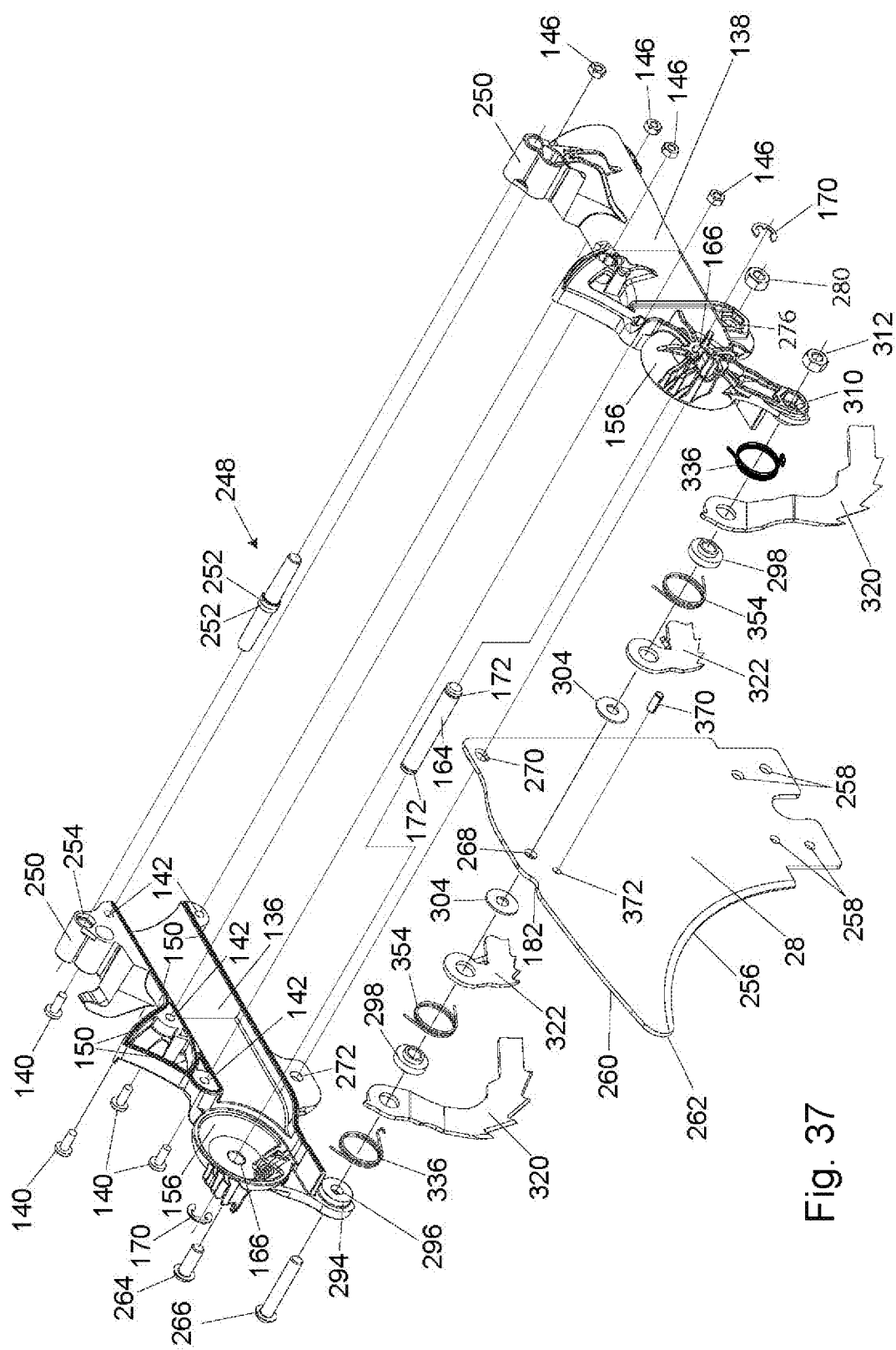
FIG. 37 shows an exploded view of a splitter and dust port assembly used in the blade guard.

Dust channel 124 continues from the upper shell into dust port 26, as shown in FIG. 35. As shown in FIG. 37, the dust port is made of two halves, a left half 136 and a right half 138, held together by four screws 140 and two bolts 264 and 266 that bolt the front, lower portion of the dust port to the splitter. Screws 140 pass through holes 142 in the left dust port half 136 and then through corresponding holes in the right dust port half 138 where they are secured with nuts 146 which fit into hexagonal shaped cavities 148, shown in FIG. 39, on the outside of the right dust port half 138 to keep the nuts from turning as the screws are tightened. Bolts 264 and 266 are similarly secured by nuts 280 and 312, respectively. Tongue and groove mating 150, positioned along the edges where the two halves of the dust port join together, help seal the dust channel within the dust port. Various views of dust port 26 are shown in FIGS. 38 through 47.

Figure 8:
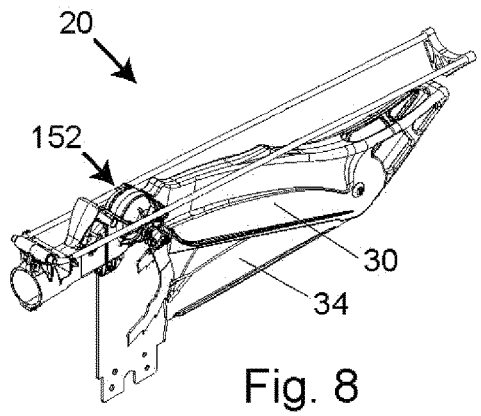
FIG. 8 shows a perspective view of the blade guard.
Figure 9:
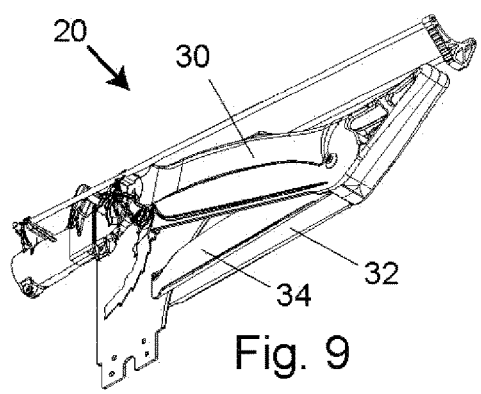
FIG. 9 shows another perspective view of the blade guard.
Figure 10:
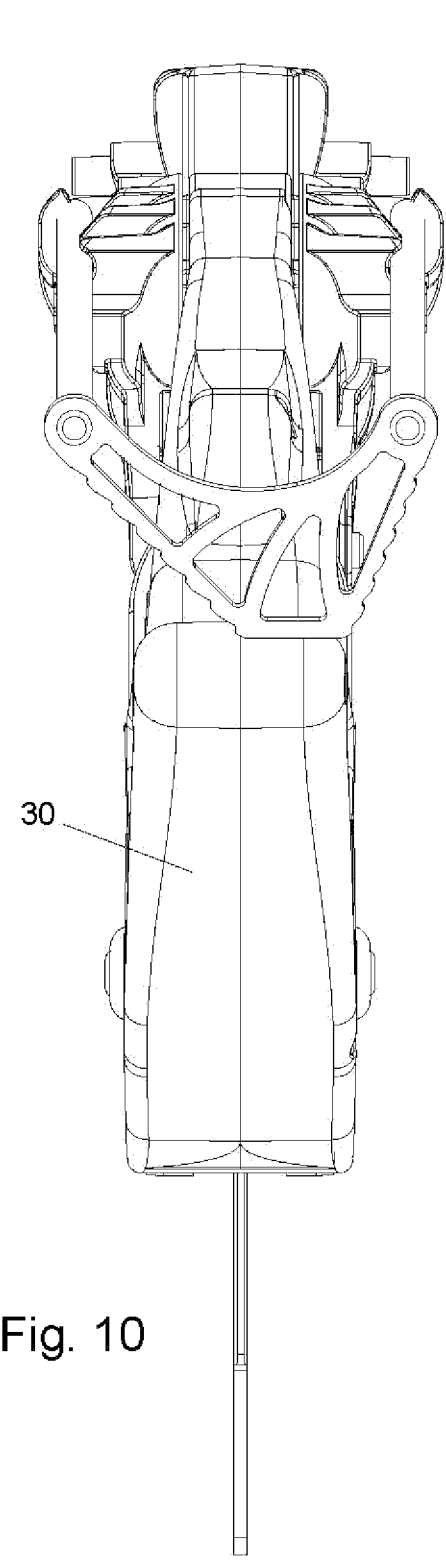
FIG. 10 shows a front view of the blade guard.
Figure 11:
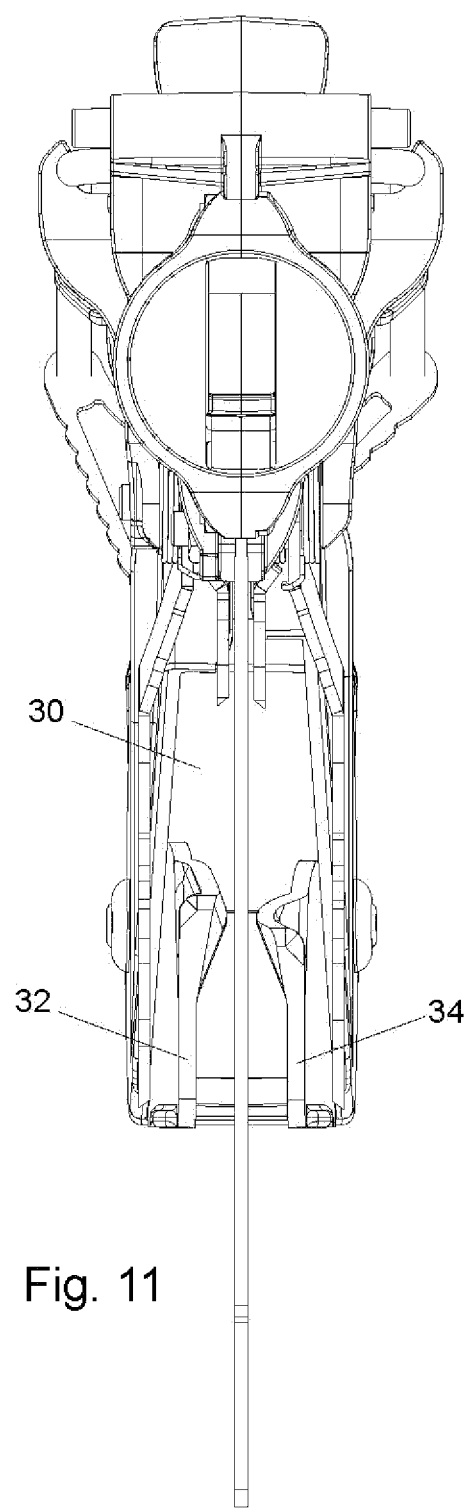
FIG. 11 shows a back view of the blade guard.
Figures 12, 13:
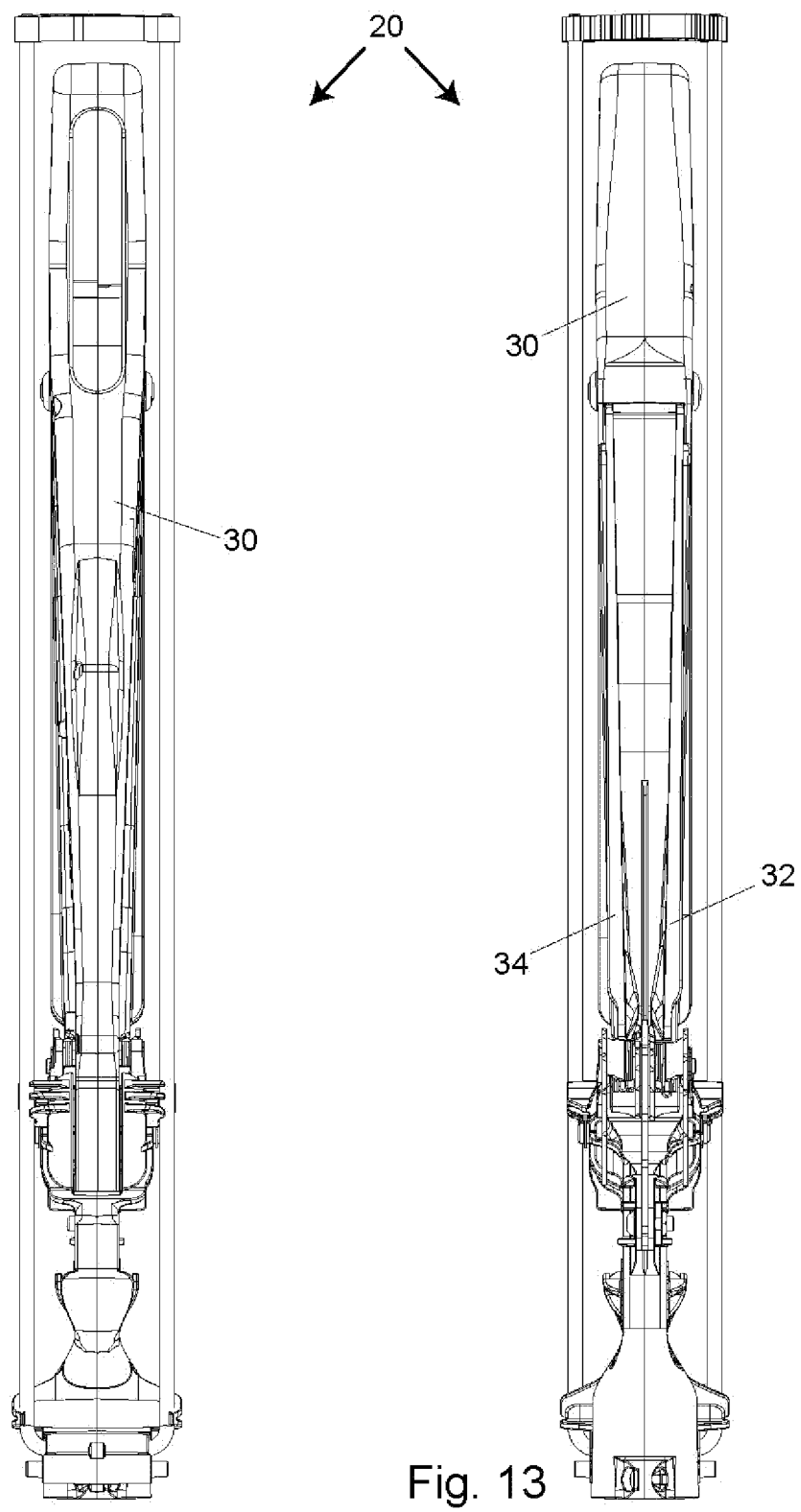
FIG. 12 shows a top view of the blade guard.
FIG. 13 shows a bottom view of the blade guard.
Figure 14:
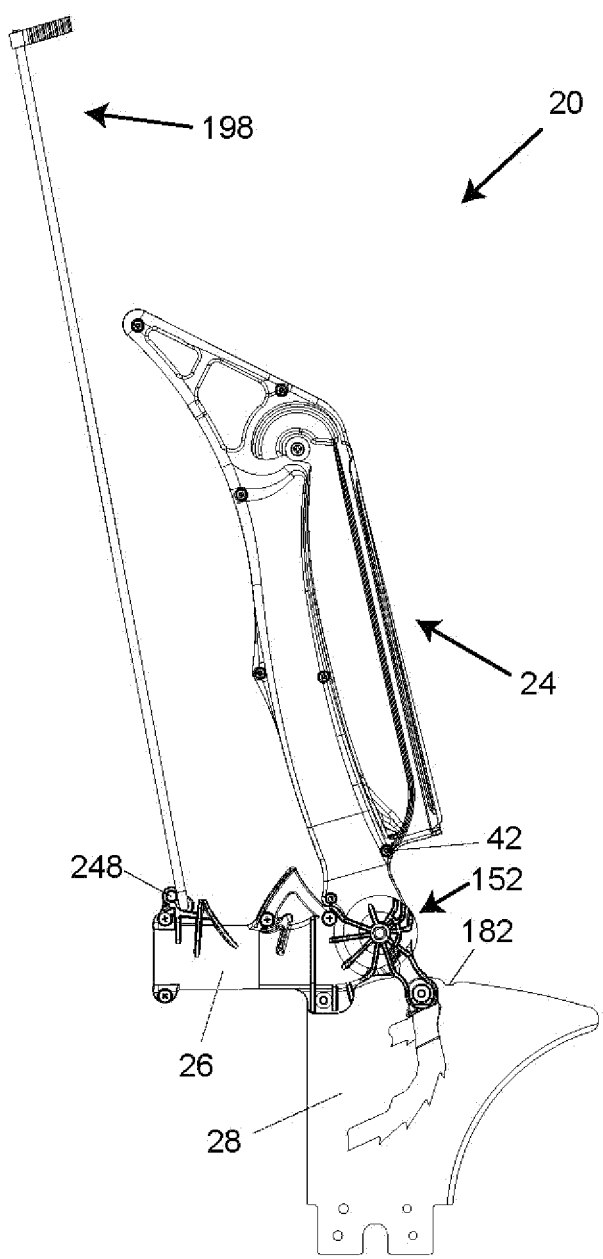
FIG. 14 shows a side view of the blade guard with the shroud and limit rod pivoted to an upright position.
Figure 53:
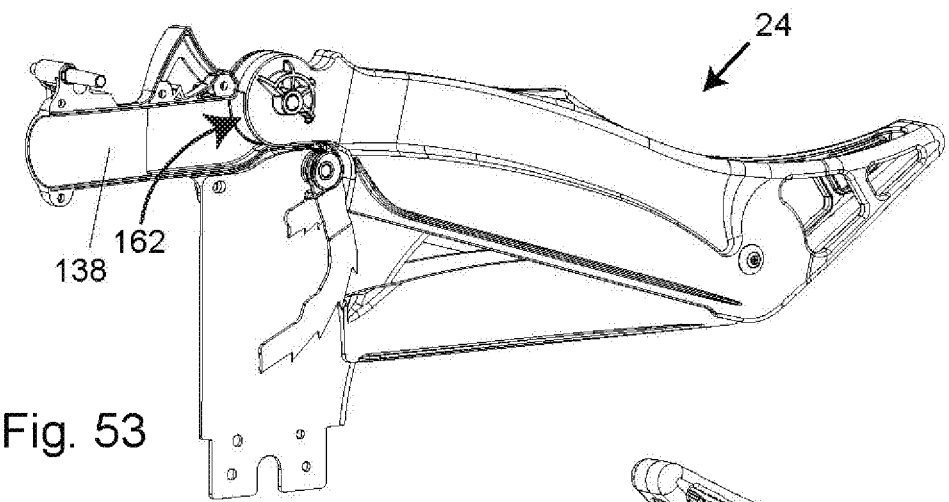
FIG. 53 shows the blade guard with the blade shroud lowered and the left dust port half removed so that the opening at the back of the pivot joint can be seen.

Dust channel 124 passes from the upper shell into the dust port through a specially designed pivot joint 152, labeled in FIGS. 8 and 14. As shown in FIG. 14, the pivot joint is positioned so that the pivot axis is above a first mounting location and rearward of the forward-most tip of the splitter. The pivot joint is designed to allow the blade shroud to pivot up and down while maintaining a sealed dust channel through the joint. The pivot joint is formed by circular regions 154 (labeled in FIGS. 16-18) molded into what may be thought of as the rear region of each upper shell half of the blade shroud. As shown in FIG. 16, each circular region 154 has a flat, circular, vertical surface 158 surrounded along the top, bottom and half-way down the back by surfaces 160 that are perpendicular to the vertical surface and which mate together with tongue and groove mating when the two upper shell halves are put together. The tongue and groove edges help seal the dust channel through the pivot joint. The lower, back portion of the circular regions 154 are left open so that when the two upper shell halves are joined together, they form an opening 162 (labeled in FIGS. 23 and 53) to allow dust moving in the channel to pass through the opening 162 and into dust port 26.

Figure 48:
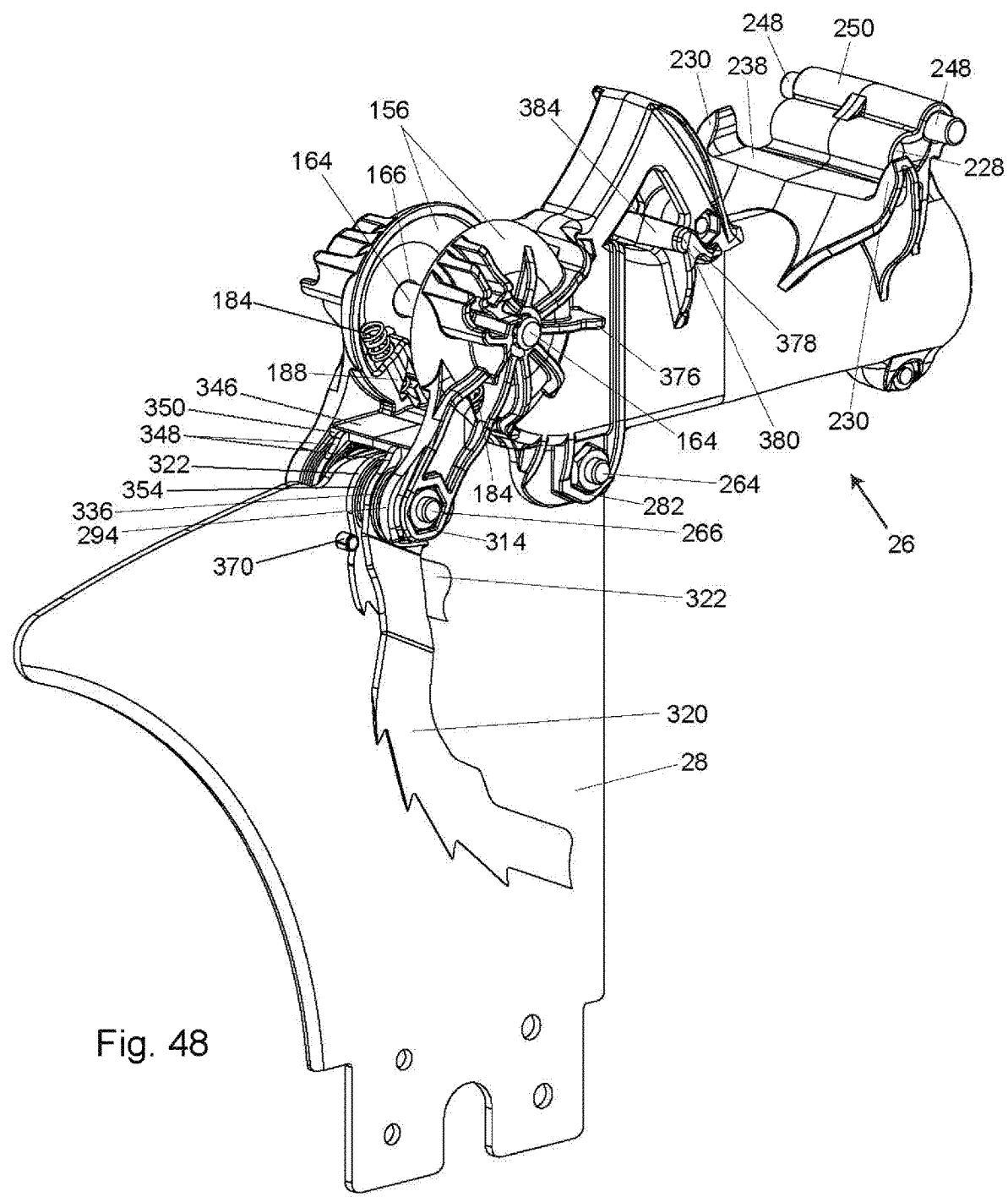
FIG. 48 shows the splitter and dust port assembly with the blade shroud removed.
Figure 49:
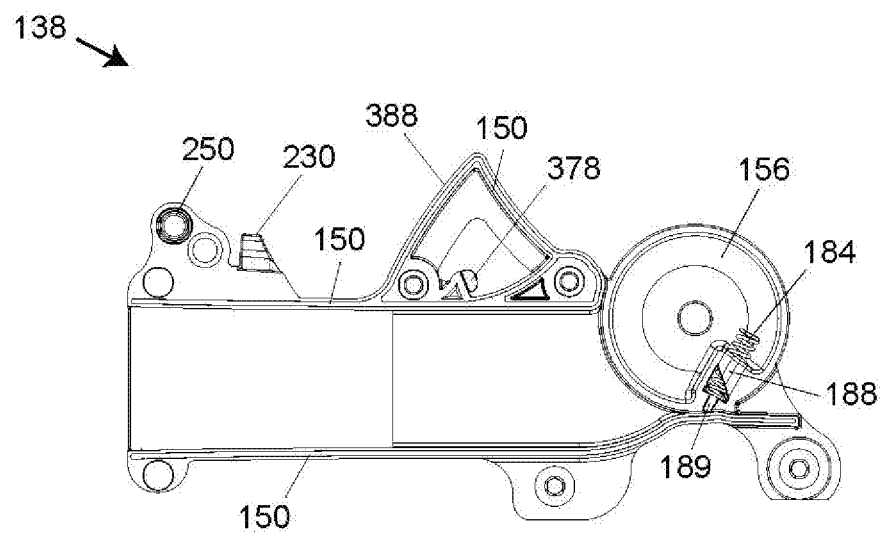
FIG. 49 shows a side view of the inside of the right dust port half with a spring installed.

The two halves of dust port 26 include circular regions 156 that form a donut shaped region. Circular regions 156 in the dust port fit over the circular regions 154 in the blade shroud to connect the blade shroud to the dust port and to form the pivot joint. At the center of the pivot joint is a pin 164 that runs through a hole 166 in one dust port circular region, as shown in FIG. 48, and through holes 168 in the circular regions in the upper shell halves, and then through a hole 166 in the other dust port circular region. Pin 164 is held in place by e-clips 170 which fit into grooves 172 in the pin, one e-clip located at each end of the pin on either side of the dust port. The upper shell, and thus the shroud, is able to pivot about pin 164. The dust channel widens in pivot joint 152 to provide room for pin 164 while maintaining essentially the same cross sectional area as the rest of the dust channel.

Figure 38:
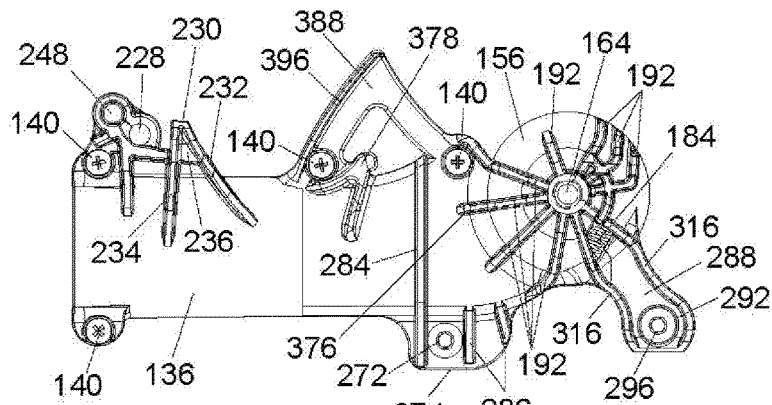
FIG. 38 shows a left side view of the dust port of the blade guard.
Figure 51:
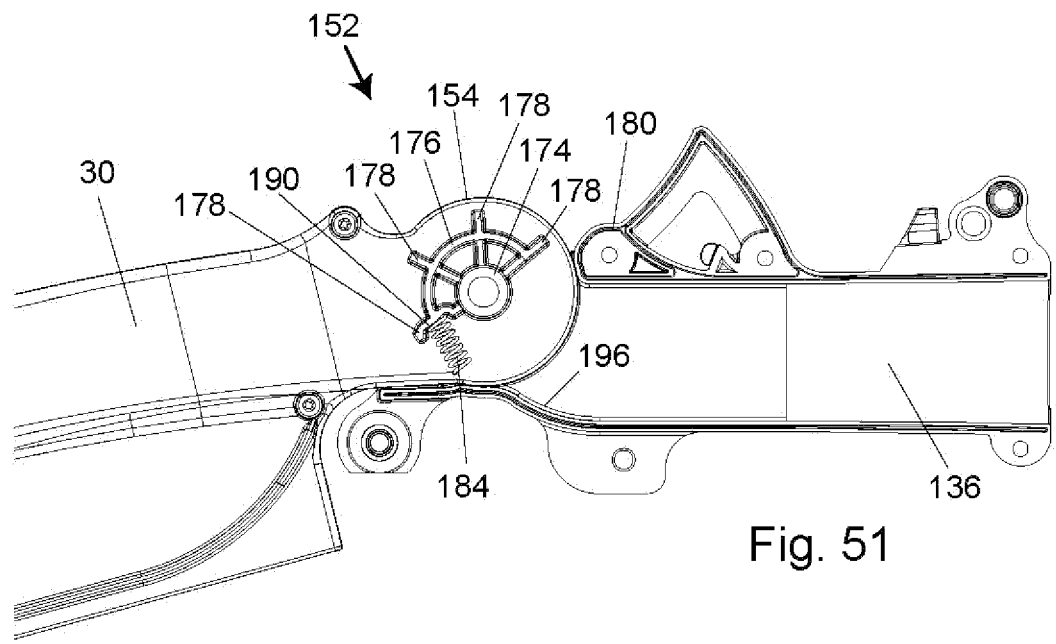
FIG. 51 shows a side view of the junction between the upper shell and the dust port with the upper shell in a lowered position and the right dust port half removed so that the position of the spring can be seen.

Ridges are formed on the outer surfaces of the upper shell circular regions 154 which serve as standoffs between the upper shell and the dust port. The ridges provide strength and keep the upper shell from wobbling from side to side. As shown in FIGS. 17 and 51, a ridge 174 in the form of a hollow cylinder projects perpendicularly out from the middle of the circular region on the outside surface of each upper shell. Another slightly shorter ridge 176, in the shape of a half-cylinder, is concentric with ridge 174 but has a larger diameter. Four fairly evenly spaced spokes 178 extend radially outward from ridge 174 along a slanted, forward and upper half portion of the ridge. The spokes pass through ridge 176 with one spoke at each end of ridge 176, as shown in FIG. 51. The ends of the spokes taper down to the surface of the upper shell near the edge of the circular region. Except for the smaller cylindrical ridge 174, a small gap is left between the outermost surfaces of the ridges and the inner surfaces of the dust port; only ridge 174 makes contact with the inner surface of the dust port in order to reduce friction as the upper shell pivots. An additional set of spoke-like ridges 192, shown in FIG. 38, are formed on the outside of the dust port donut-shaped regions 156 in order to strengthen the dust port and the pivot joint.

The blade shroud described above can pivot from a lowered position that allows the side extensions to rest on the table surface to an upright position that allows access to the blade. When the blade shroud is pivoted to an upright position, a hump 180 on the top of the dust port (shown in FIGS. 51 and 52) contacts the upper shell to keep it from pivoting too far back. The hump is positioned and shaped so the blade shroud can pivot up, past a vertical center, so that a user can raise the blade shroud to access the blade and the shroud will stay in the up position by the shroud resting against the hump. The shroud may include a curved surface to mate with the hump.

When the blade guard is taken out of the saw, the plastic boss around one of the screws 42 on the underside of the upper shell hits a dip 182 along the top of the splitter (dip 182 is labeled in FIG. 14) which keeps the upper shell from rotating too far downward, which would make the blade guard awkward to handle.

Figure 50:
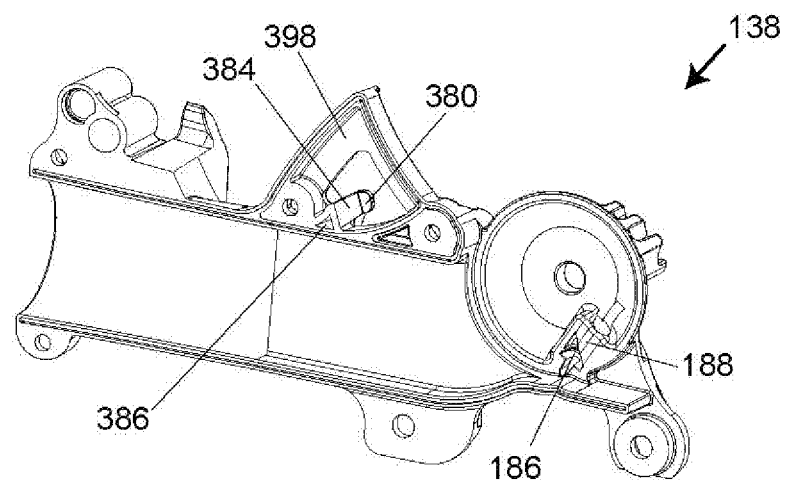
FIG. 50 shows a perspective view of the inside of the right dust port half without a spring installed.
Figure 52:
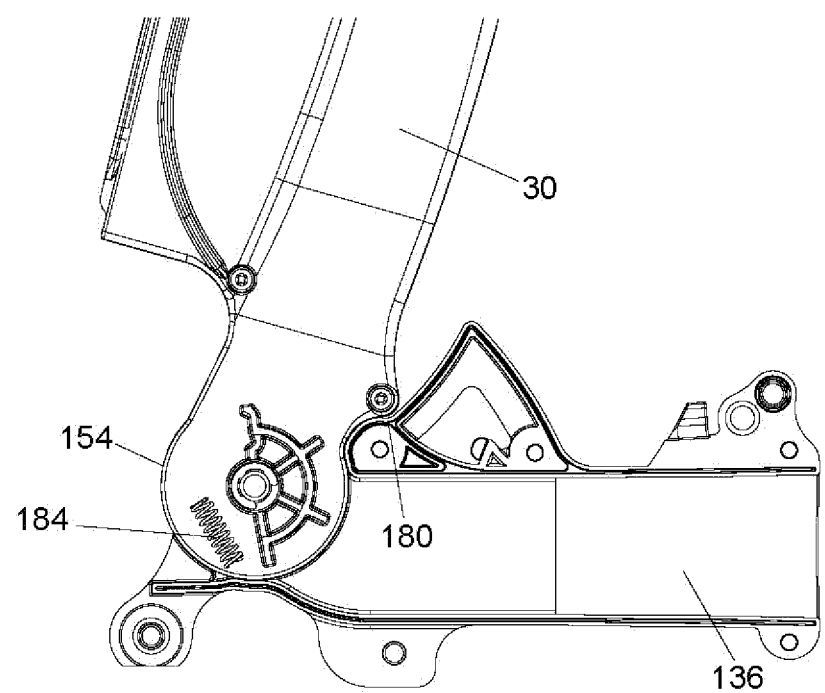
FIG. 52 shows a side view of the junction between the upper shell and the dust port with the upper shell in an upright position and the right dust port half removed so that the position of the spring can be seen.

Dust port 26 includes two springs 184 located in the pivot joint, one in each dust port half, as shown in FIGS. 48, 49, 51 and 52. The springs push against the blade shroud to lighten the load at the nose of the blade guard so that the blade shroud is easier to lift. The bottom of each spring fits within a groove 186 on the inside lower part of the pivot joint, as shown in FIG. 50. A rectangular enclosure 188 extends outward from the inside wall of the dust port and encloses the middle and lower portion of the spring on three sides to hold the spring in place. The enclosure 188 is actually formed out of material from the dust port in the donut shaped regions 156 that is pushed inward leaving an opening on the side of the pivot joint where the spring can be seen from the outside, as shown in FIG. 38. The enclosure is formed this way so that the whole dust port half can be made with one mold. The spring is situated at a forward angle and when the blade shroud is in its horizontal position, the top of the spring presses against a ridge 190 in the upper shell of the blade shroud, as illustrated in FIG. 51. When the blade shroud is raised, the spring is relaxed, as illustrated in FIG. 52. A small area of material is removed from each dust port half at the bottom of the spring, as shown at 189 in FIG. 49, to allow dust that may fall onto the spring to escape so that it does not collect in the enclosure and interfere with the operation of the spring.

A blade guard as described above creates a powerful airflow that redirects and forcefully blows dust out through outlet 194 in dust port 26 (outlet 194 is labeled in FIG. 43). The dust leaving outlet 194 can be left to collect in a pile, it can be collected by a bag attached to the outlet, or better yet, it can be collected by a vacuum system connected to the outlet. Outlet 194 is shaped to accommodate the end of a vacuum hose. The inside surfaces of the dust port are slightly tapered inward moving into the port to match the taper of many vacuum hoses. This allows the hose to connect to the port by a press-fit.

Figure 54:
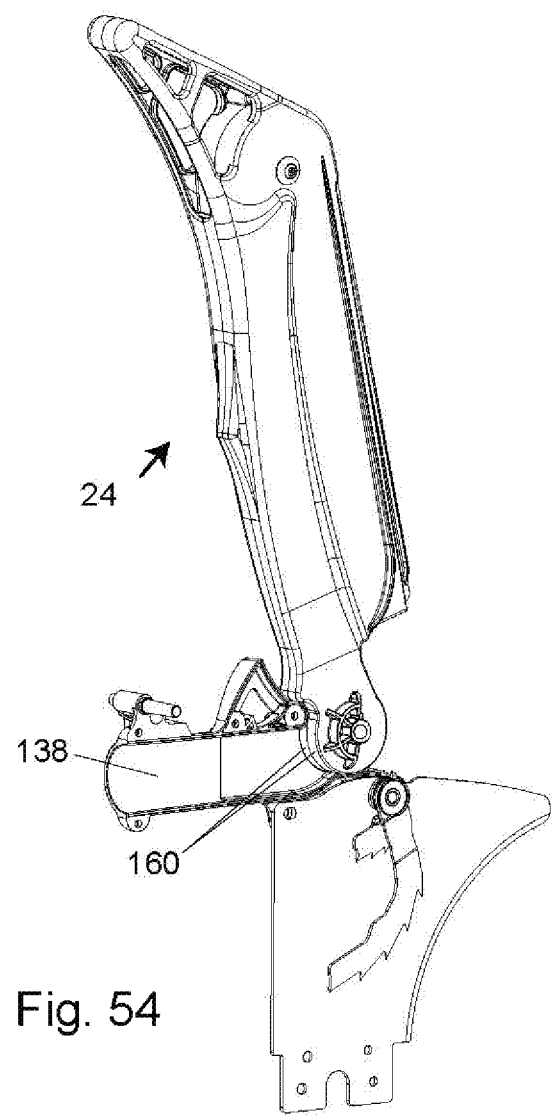
FIG. 54 shows the blade guard with the blade shroud in an upright position and the left dust port half removed so that the closed surface of the pivot joint can be seen.

The design of the pivot joint 152 enables the dust channel to be closed when the table saw is not in use so that another tool hooked up to the same vacuum system will not lose suction. Pivoting the blade shroud to its upright position rotates the opening at the back of the upper shell downwards, thereby closing off the dust channel, as shown in FIG. 54. The bottom inside surface of the dust port slopes upward as it approaches the pivot joint from the rear, as can be seen at 196 in FIG. 51, and this helps seal the area between the blade shroud and the dust port at the bottom of opening 162 to help keep dust from escaping.

A dust port and pivot joint as described above allows a blade guard to include effective dust collection while still including a blade shroud that is able to pivot up and down to allow a workpiece to approach the blade. The rigid support of the dust port and pivot joint prevents a vacuum hose from moving the blade shroud out of position and also reduces the risk of the vacuum hose disconnecting as the blade guard moves.

Blade guards equipped with a rigidly supported dust port and pivot joint may also include a limit rod or material block to prevent a user from feeding a workpiece into the blade that is too tall or thick to move past the rear portion of the blade guard. A workpiece that is too tall will not be able to pass through the blade guard because it will bump into the splitter, anti-kickback pawls, or some other component of the blade guard as it moves past the blade. In that situation, the workpiece will have to be pulled back towards the user to remove it from the blade guard.

Figure 4:
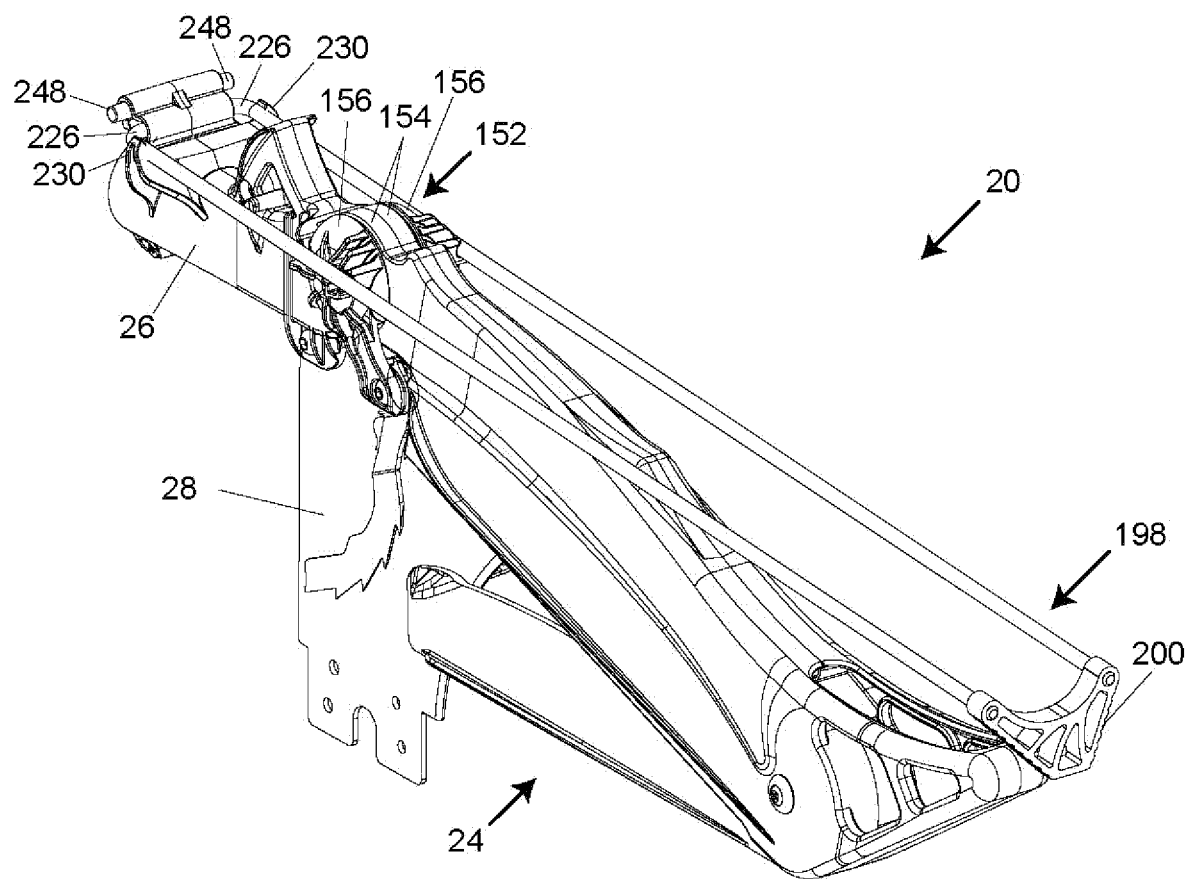
FIG. 4 shows a perspective view of the blade guard.
Figure 5:
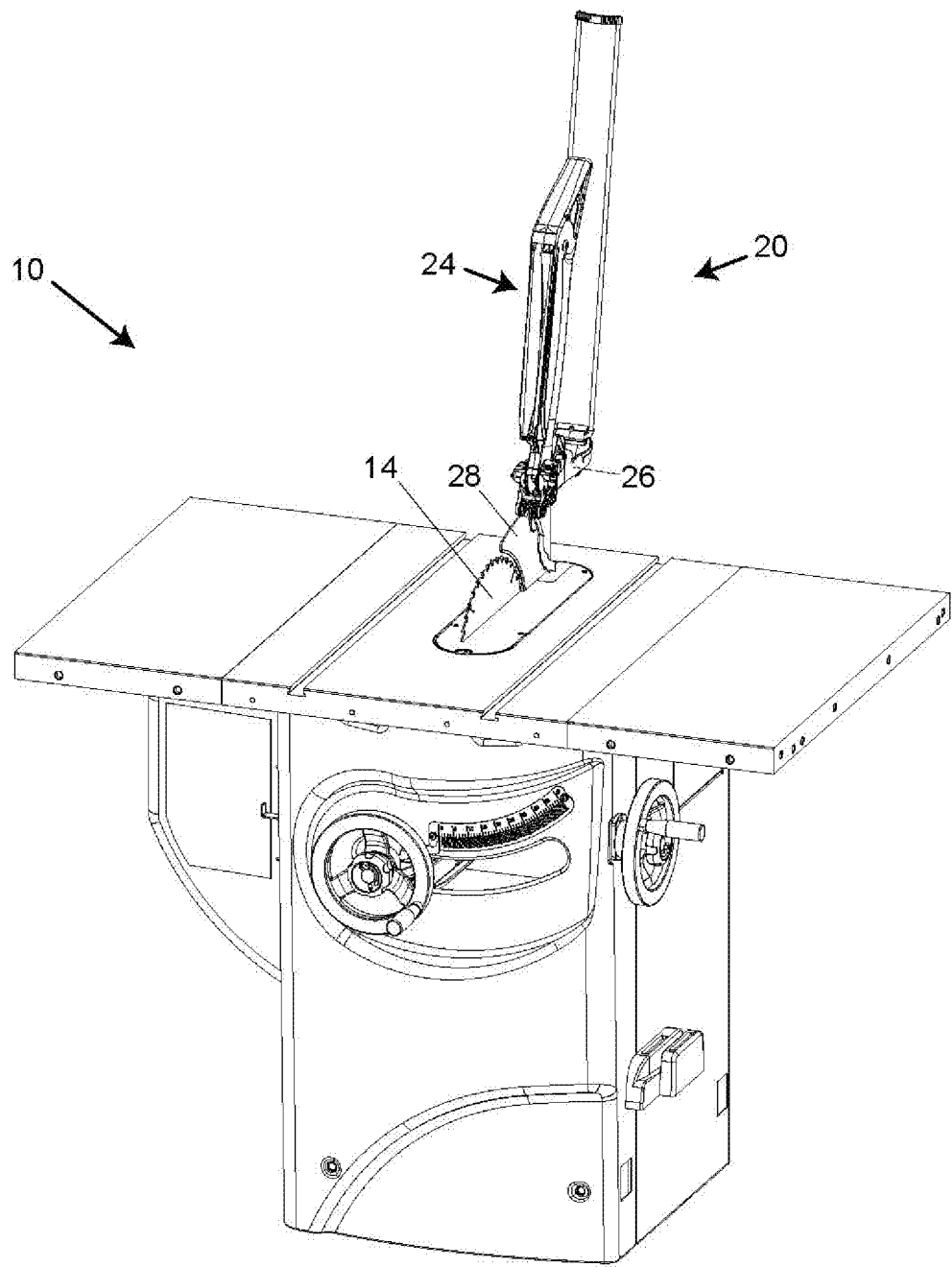
FIG. 5 shows the blade guard installed in the table saw of FIG. 1 with the shroud and limit rod pivoted to an upright position.
Figure 6:
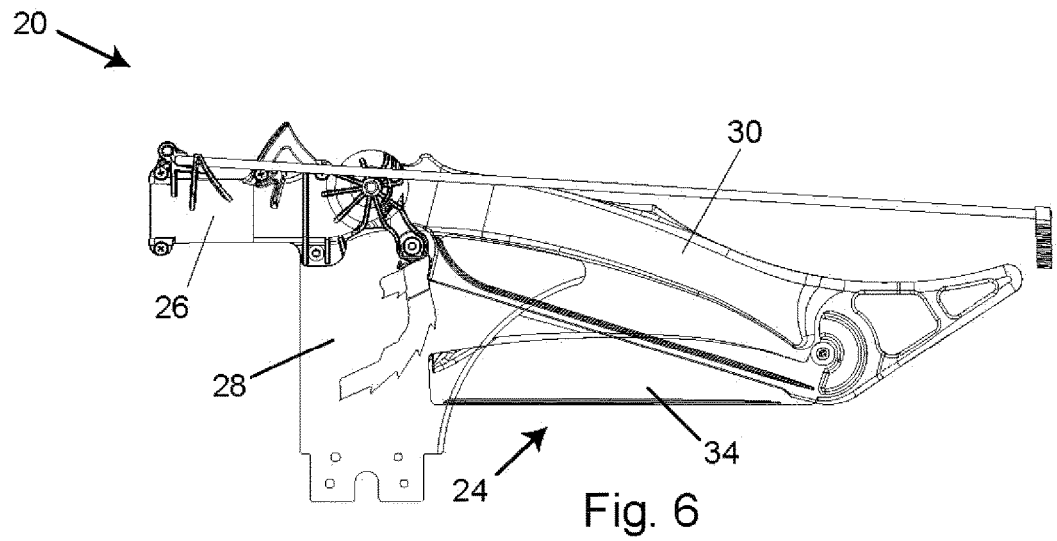
FIG. 6 shows a left side view of the blade guard.
Figure 7:
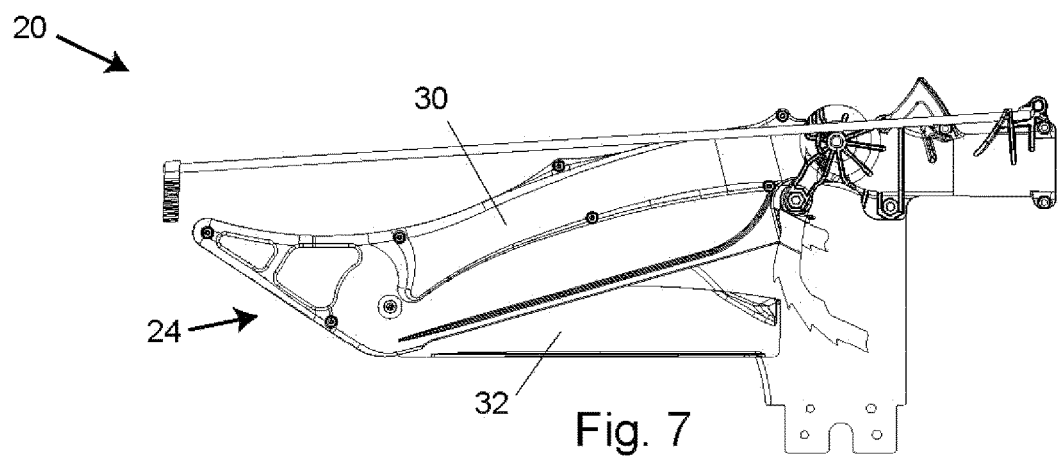
FIG. 7 shows a right side view of the blade guard.

In order to prevent a piece of wood or workpiece that is taller than the height of the blade from entering the blade guard described herein, a limit rod 198, shown in FIG. 4, extends out past the front of the blade guard. The limit rod includes a wood stop 200 at its forward most end, and a workpiece that is too tall will hit the wood stop 200 and be stopped before it contacts the blade shroud.

FIGS. 55 through 58 show various views of the limit rod isolated from other structure. As stated, the limit rod includes a wood stop 200 at its forward end. Wood stop 200 consists of a piece made of a light, rigid material, such as aluminum or plastic, generally triangular in shape and pointed downward with the tip clipped so that there is a flat surface 202 along the bottom, as shown in FIG. 56. As shown In FIG. 14, the limit rod can be rotated up to an upright position. The flat surface 202 along the bottom distributes a load over a larger area to minimize damage that may occur if the limit rod is accidently bumped from an upright position so that it falls forward towards the table under freefall.

In use, the left end 206 of the flat surface 202 stays near the centerline of the blade as the blade tilts to the left so that the left end 206 remains at the same height. The wood stop may be asymmetric if centered with respect to the blade, or symmetric if offset with respect to the blade. Either way, the left side 204 of the wood stop is angled at 45 degrees or more from the surface of the table (when flat surface 202 is parallel to the table top) to prevent interference with the table when the blade is tilted up to 45 degrees. The right side 208 of the wood stop may or may not be angled.

Wood or any other workpiece that is higher than the lowest point on the wood stop and which is being fed into the saw blade at an angle will tend to cause the wood stop to deflect as the wood encounters a sloped left or right side, 204 or 208, of the wood stop if the side is smooth. Instead of stopping the wood, the wood stop will simply ride up the edge of the wood. To prevent this, dimples or notches 210 are cut out along the left and right sides, 204 and 208, of the wood stop as shown in FIG. 56. The notches are formed by small sections that slope inward when moving towards the bottom of the wood stop, as shown at 212, and then abruptly change to slope outward along a very small segment 214. When the wood encounters the wood stop at an angle, it slides along the longer inwardly sloped section 212 of the notch 210 until it catches on the small segment 214, at which point the wood is stopped. Putting notches along the left and right sides of the wood stop is only one way to reduce the slickness of the side surfaces so that the wood is stopped when it encounters the wood stop. Notches are not needed along the bottom, flat surface 202 even though this surface is at an angle when the blade is tilted. This is because in this orientation the limit rod is more rigid and resists moving upwards when the wood encounters the flat surface. However, notches could be added along the bottom surface, if desired.

Areas 216 may be cut out from the face of wood stop 200 to keep the wood stop lightweight and to facilitate manufacturing if the wood stop is an extruded part. The larger the cutouts and the larger the radii at the corners of the cutouts, the easier it is to extrude the part. As shown in FIG. 56, cutout areas 216 are separated by ribs 218 extending from the top to the bottom of the wood stop. The ribs are positioned to provide structural strength to the wood stop most particularly along the flat bottom section 202 that would take the impact if the limit rod were to fall towards the table from an upright position. The ribs are about the same width as the rest of the structure of the wood stop to help with material flow in the extrusion process and to keep cooling times uniform in order to reduce warping.

Wood stop 200 has two holes 220 through its face, one at the top left corner and one at the top right corner, as shown in FIG. 56. Holes 220 are for mounting the wood stop on the ends of two metal rods 222 which pass through the holes. The holes are drilled through the wood stop at a slight angle so that the wood stop will be oriented generally vertical while the rods slope slightly downward as they extend towards the front of the blade guard. The rods pass through the holes with the top half of the ends of the rods protruding out slightly farther through the front of the wood stop, since the rods are at an angle relative to the wood stop. The holes are made slightly smaller than the rods and a small chamfer 224 at the end of each rod allows the rods to be forced into the holes in the wood stop. This stretches the material of the wood stop and creates a press-fit that holds the rods in place. The rods and wood stop could be joined in other alternative ways, such as with screws and adhesives or they could be welded.

Figure 39:
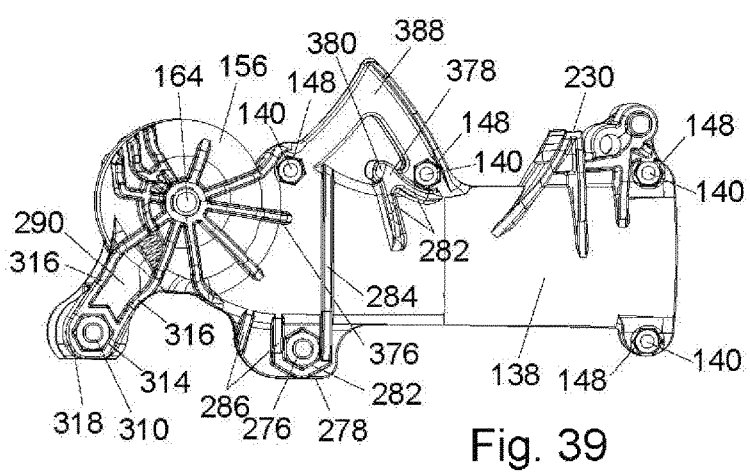
FIG. 39 shows a right side view of the dust port of the blade guard.

Limit rod 198 is designed for use with a dust port as described previously. Dust port 26 includes holes 228 positioned on the top of the dust port toward the rear, as shown in FIGS. 38 and 39. The ends of rods 222 opposite the wood stop are bent at an angle near 90 degrees, as shown in FIG. 57. Bent ends 226 fit into holes 228 at the top of the dust port, on either side of the dust port, as shown in FIG. 4. The inside surfaces of holes 228 taper outwards moving into the dust port to accommodate a tolerance in the bend of the rods. The rods make contact with the holes at a point near the entrance where the radius of the bend in the rod is nearly always the same as a result of the manufacturing process.

As shown in FIGS. 4 and 46, two fingers 230 extend up from the top of the dust port, one along the outside of each rod, to capture the rods so that the ends of the rods do not fall out of holes 228. The fingers are formed by a sloped front surface 232 and a vertical back surface 234 that are both perpendicular to a side surface 236 that spans the space in between the inner edges of the front and back surfaces, as shown in at least FIGS. 38 and 47. The front and back surfaces meet at the top like a triangle forming the fingers. A flat, horizontal surface 238 intersects the front and back surfaces on each finger just above the dust port and stretches across the dust port between the two fingers, as shown in FIG. 48. Flat surface 238 provides a place upon which rods 222 may rest. The area along the outside of the dust port between front surface 232 and back surface 234 is left empty to keep the thicknesses of the surfaces about the same. This minimizes warping distortions that may occur when areas of different thicknesses cool in the manufacturing of the molded plastic dust port.

FIG. 3 shows limit rod 198 in its locked position running generally horizontal alongside blade guard 20. To keep the rods stiff and the deflection of the wood stop at a minimum, the limit rod is angled slightly downward moving towards the front of the blade guard and it is kept in position and some tension by snap-lock retaining grooves 240, best seen in FIG. 46, on either side of the dust port. As the limit rod is lowered from its upright position, it first encounters the sloped surfaces 242 on three of the dust port structural ridges 192 that extend out from hole 166 at the center of the pivot joint to form part of the snap-lock retaining grooves which hold the limit rod in place. Surfaces 242 slope outwards moving down so that they move the two rods apart as the rods are lowered. The surfaces 242 then end abruptly and the rods fall into grooves 240 just below the end of the sloped surfaces to lock the limit rod in place. The distance between the inner wall 246 of each groove 240 is wider than the distance that there would naturally be between the rods so that the rods are somewhat bowed outwardly when they snap into place to create tension in the rods. Bowing the rods outward also provides clearance for other dust port features. The tension is further increased by the fingers 230 at the back of the dust port and wood stop 200 at the front of the rods which limit the distance between the rods. Moving forward from the rear of the limit rod, the distance between the rods increases more rapidly up to the snap-locks due to the bowing effect and then more gradually moving towards the wood stop at which point the rods are at their maximum distance apart. This maximum distance is kept as small as possible while providing some room for the deflection of the blade guard between the rods.

When not in its locked position, the limit rod is free to pivot between an upright position of a little over 90 degrees, as shown in FIG. 14, and a nearly horizontal position, as shown in FIG. 15. This allows the user to pivot the limit rod up and out of the way to gain better access to the blade or saw without having to remove the limit rod from the blade guard. Rubber bumpers 248, shown in FIGS. 4 and 48, at the rear of the dust port provide a support for the limit rod to lean against when in its upright position. If the limit rod were to be pivoted upwards with enough vigor, or forced back while in its upright position, the dust port may break when the limit rod hits the back bumper due to the mechanical advantage arising from the length of the limit rod. Therefore, the bumper is made in such a way that it will support the limit rod in its upright position under normal conditions but will flex and allow the limit rod to pivot beyond the angle of its normal upright position if a significant force were to act on the limit rod. For example, in FIG. 37 the bumper is shaped like a narrow cylinder of stiff rubber that is held in place in a cylindrical enclosure 250 positioned across the rear of the dust port and which extends outwards from the cylindrical enclosure on each end. The stiffness of the rubber and the length at which the ends extend outward from the enclosure determine how easily the rods can slip past the bumper. To better secure the rubber bumper in the enclosure, both the rubber bumper and the enclosure are tapered outwards slightly moving towards the center of the enclosure and at the middle there is a narrow section 252 in the rubber bumper of a larger diameter that fits in a corresponding groove 254 in the enclosure at the inner edge of each dust port half. In this way, the rubber bumper is restricted from sideways movement so that it does not fall out of the enclosure.

The blade shroud 24 and the limit rod 198 are both supported by the dust port 26 and the dust port is, in turn, supported by splitter 28 which mounts in the saw and protrudes up through slot 16 in the table insert 18. As shown in FIGS. 15 and 37, splitter 28 is a flat metal piece that fits in the saw behind the blade and has a curved front 256 with a beveled edge that follows the curve of the blade 14. Four holes 258 at the base of the splitter are used for mounting the splitter in the saw. The base of the splitter may be thought of as the bottom region of the splitter. The top edge 260 of the splitter has a slight curve that follows the curvature of the divider wall 120 in the upper shell. Divider wall 120 is just above the splitter but does not make contact with the splitter when the blade shroud is in a horizontal position. As mentioned earlier, there is a dip 182 at the top of the splitter within which one of the screws 42 in the upper shell rests to support the upper shell in its horizontal position. The front and top curves of the splitter meet to make a rounded corner or tip 262 at the front end of the splitter which extends forward to a point nearly in line with the middle of the blade.

The dust port 26 mounts to the splitter 28 with two bolts, 264 and 266, which pass through holes positioned along the top of the splitter, one hole 268 towards the middle of the splitter and another hole 270 at the rear of the splitter, as shown in FIG. 37. Each bolt passes through a set of tabs or extensions that extend down from the bottom of the dust port on either side of the splitter, straddling the splitter. Bolt 264 passes through hole 272 in a short dust port extension 274, shown in FIG. 38, that extends down vertically at the rear of the splitter and then through the horizontally oriented oval hole 270 in the splitter and finally through hole 276 in another dust port extension 278, shown in FIG. 39, on the other side of the splitter. Hole 270 is oval to allow some margin in the position of the holes in the dust port extensions in relation to the splitter to compensate for variations inherent in the manufacturing of the plastic dust port. Bolt 264 screws into a nut 280 which fits within a hexagonal cavity 282, shown in FIGS. 39 and 48, molded on the outside of dust port extension 278 to keep the nut from turning as the bolt is tightened. This conveniently removes the need for a tool to hold the nut during assembly or adjustment of the dust port. As shown in FIG. 38, a long vertical ridge 284 runs down the side of the dust port and dust port extension 274 near the back edge of the splitter to add strength. Two more short ridges 286, one vertical and one nearly vertical with a slight forward angle, run down dust port extension 274 on the other side of bolt 264. The long and short ridges 284 and 286 are mirrored on the outside of dust port extension 278 on the other side of the splitter, as shown in FIG. 39.

Figure 71:
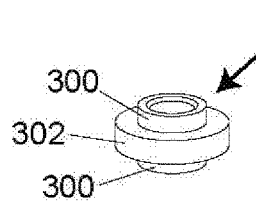
FIG. 71 shows a bushing for use with an anti-kickback pawl.
Figure 72:
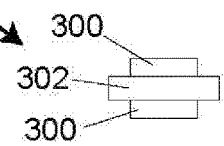
FIG. 72 shows another view of a bushing.
Figure 73:
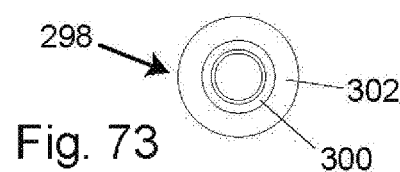
FIG. 73 shows still another view of a bushing.

A thicker and longer set of dust port extensions 288 and 290, shown in FIGS. 38 and 39, extend down from the front of the dust port at a forward angle and straddle the splitter. The head of a bolt 266 sits in a circular cavity 292 at the bottom of dust port extension 288. On the inner side of dust port extension 288, there is a raised circular area 294, shown in FIGS. 37 and 46, that protrudes inward and surrounds a hole 296 through which bolt 266 passes. Bolt 266 then passes through the middle of a bushing 298 which is made like a cylinder with two smaller diameter sections 300 surrounding a larger diameter middle section 302, as shown in FIGS. 71-73. After the bushing, bolt 266 passes through a washer 304 and then the circular hole 268 in the splitter. Once past the splitter, bolt 266 passes through a second washer 304, a second bushing 298, and finally a hole 310 through a raised circular area on the inside wall of extension 290. Bolt 266 screws into a nut 312 seated in a hexagonal cavity 314 on the outside of extension 290, as shown in FIG.

Figure 41:
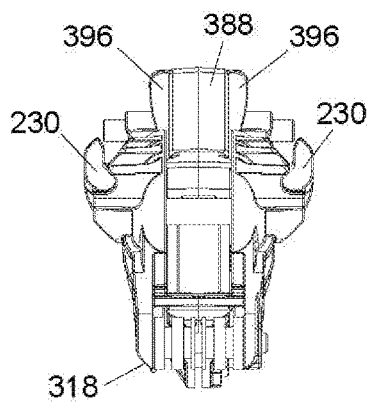
FIG. 41 shows a front view of the dust port of the blade guard.
Figure 42:
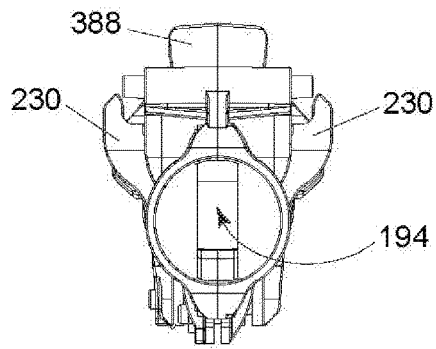
FIG. 42 shows a rear view of the dust port of the blade guard.

39. A ridge 316 extends down from a couple of the spoke ridges 192 along the outside edges of extension 288 for strength. Ridge 316 is mirrored on the outside of dust port extension 290 on the other side of the splitter. As shown in FIG. 41, the bottom side edge 318 of dust port extension 288 is cut at a forty-five degree angle that slopes inward moving down so that the extension does not interfere with the table when the blade and blade guard are tilted to forty-five degrees.

One or both of holes 268 and 270, though which the dust port mounts on the splitter, may be oversized so that the dust port can rotate or tilt slightly upward or downward. For example, hole 270 may be slightly oversized or shaped so that the dust port can pivot slightly around hole 268. Allowing the dust port to pivot or tilt slightly provides a way to adjust the position of the bottom surface of wood stop 200 on the front end of limit rod 198 relative to the table top. For example, if it is desired for the bottom of the wood stop to be a certain distance above the table, the dust port can be tilted up or down until the bottom of the wood stop is at the desired distance and the dust port can then be secured in position. This is useful to accommodate manufacturing tolerances in the limit rod and dust port when the wood stop must be precisely positioned.

The configuration described of how the dust port mounts on the splitter provides a rigid connection between the dust port and splitter. In turn, the rigid connection allows the dust port to support a vacuum hose without the weight and position of the hose hindering the movement of the blade shroud.

Figure 77:
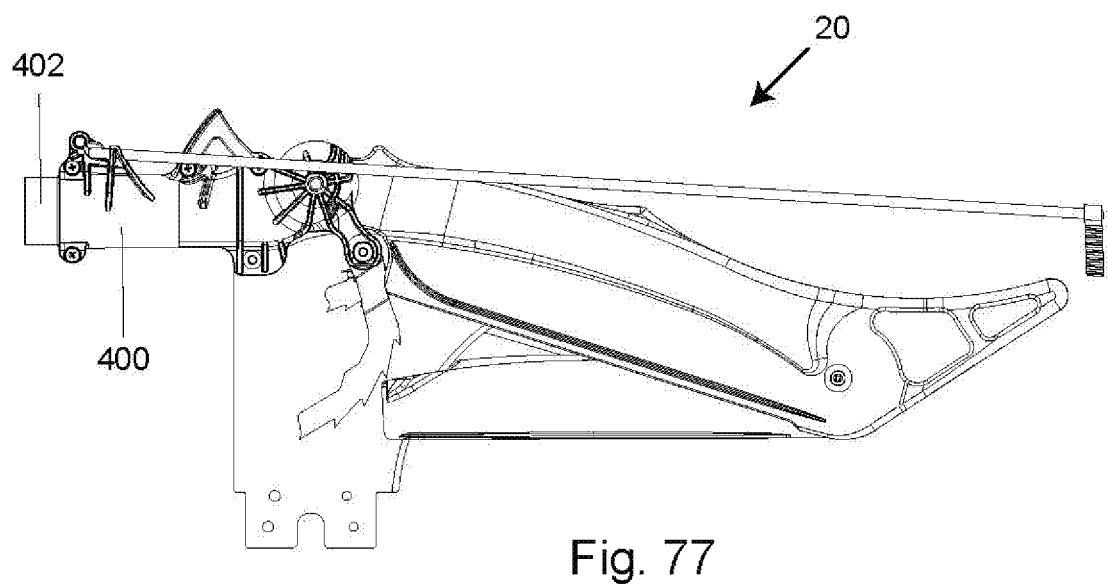
FIG. 77 shows a blade guard with an extension on a dust port.
Figure 78:
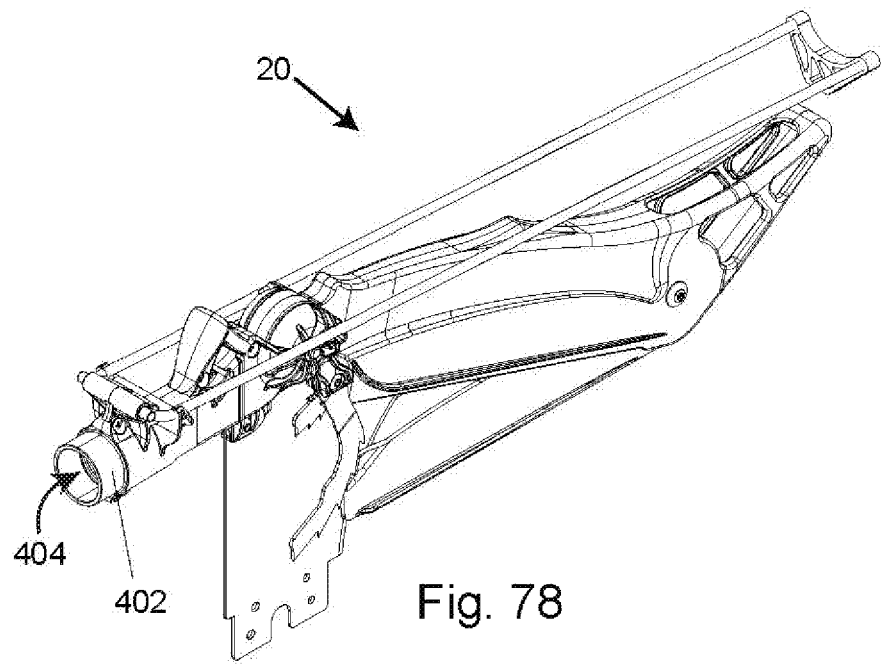
FIG. 78 shows another view of an extension on a dust port.
Figure 79:
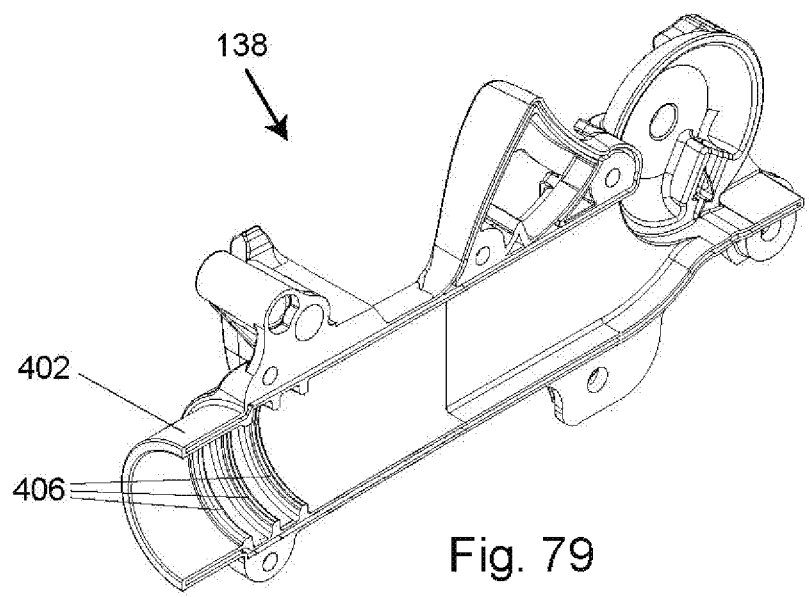
FIG. 79 shows a cross-sectional view of an extension for a dust port.
Figure 80:
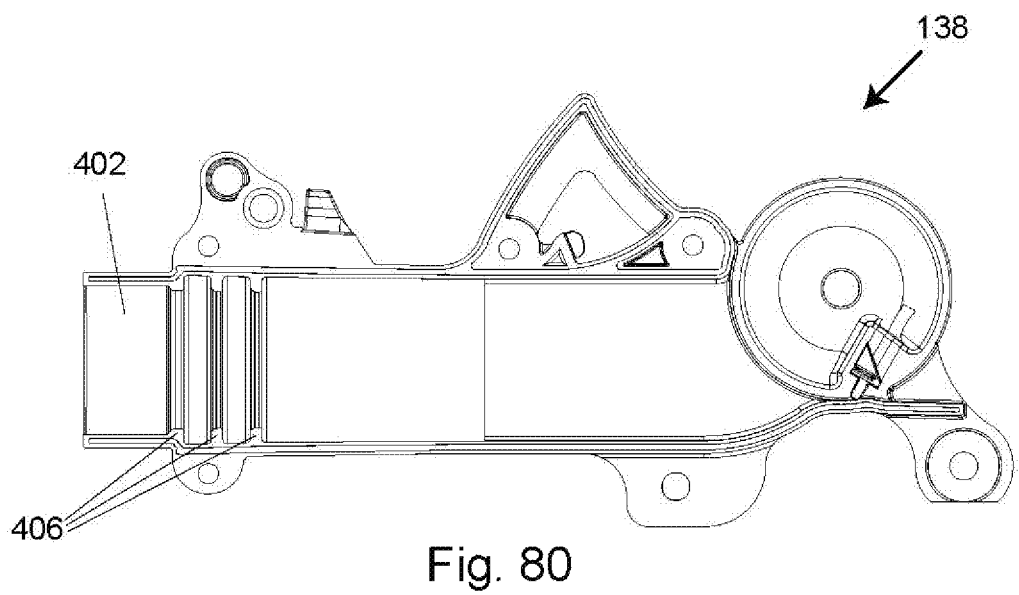
FIG. 80 shows another cross-sectional view of an extension for a dust port.

The dust port may also be designed with an extension that allows a choice of one of two hose sizes to connect to the dust port outlet. FIGS. 77 and 78 show a blade guard with a dust port 400 that has an extension 402. The extension forms a dust port outlet 404 that the end of a hose can fit into or, alternatively, a hose of a larger diameter can fit over. Three ring shaped ridges 406 are molded on the inside surface of, and are concentric to the dust port outlet, as shown in FIGS. 79 and 80, which show the right dust port half 138 without other structure. The rings are of decreasing diameter moving inwards so that at least one ring will match the taper of the inserted hose and create a secure press-fit connection.

Blade guard 20 is also equipped with two sets of anti-kickback pawls, as shown at 320 and 322 in FIG. 48 and other figures. The anti-kickback pawls are mounted to the splitter in such a way that they are able to pivot. As a workpiece is moved forward past the blade, it encounters the anti-kickback pawls which, under normal conditions, pivot up when pushed back to allow the workpiece to slide easily underneath. The anti-kickback pawls gently ride on top of the workpiece as the workpiece moves past. Once the workpiece passes the anti-kickback pawls, springs work to pull the anti-kickback pawls forward again to their original position. However, in a kickback situation where the blade kicks the workpiece back toward the user, often with some force, the pawls, under cam action, pinch the workpiece between the table and the sharp pointed tips along the bottom edge of the anti-kickback pawls and the sharp tips dig into the workpiece to prevent the workpiece from being propelled toward the front of the blade and the user.

Figure 63:
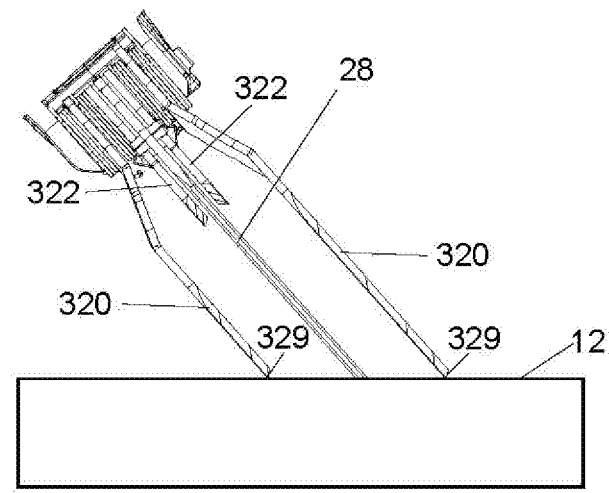
FIG. 63 shows anti-kickback pawls angled to the left.

FIGS. 59 through 62 show various views of the right large anti-kickback pawl 320. The large anti-kickback pawl is made of a metal piece with generally flat surfaces spaced apart by an outward bend 324 near the top and an inward bend 326 a short distance below the outward bend so that the upper portion of the pawl is parallel to, but at a distance from, the bottom portion of the pawl. Notches are cut out along the curved, lower edge of the pawl to create five sharp, pointed tips 328 that are equally spaced along lines drawn from tip to tip. A chamfer 329, cut at about 45 degrees along the bottom edge of the pawl, makes the tips 332 even sharper. The sharp tips are spaced so that ideally only one tip contacts the workpiece at a time so the load is not spread out over many tips as this would decrease the tips ability to grab the workpiece. The sharp tips are cut at an angle such that they do not interfere with a workpiece as it moves forward enabling the workpiece to slide easily under the anti-kickback pawls. The sharp tips are also designed to be at an angle such that if the blade was to catch and propel the workpiece back toward the user, the tips of the anti-kickback pawls can grab into the workpiece to keep it from moving back. The chamfer 329 is cut along the inside surface (closest to the splitter) of the left large pawl and on the outside surface (farthest away from the splitter) of the right large pawl, as seen in FIG. 63, so that as the blade is titled to the left only the tips of the pawl will remain in contact with the surface of the table or workpiece. If the chamfer were on the outside face of the left large pawl, or the inside face of the right large pawl, then the chamfer would tend to line up with, or lie flat on, the table or workpiece surface and the pawl would not work as effectively. Both the right and left pawls can be stamped with the same tool before bending if the chamfers are as described.

Figure 64:
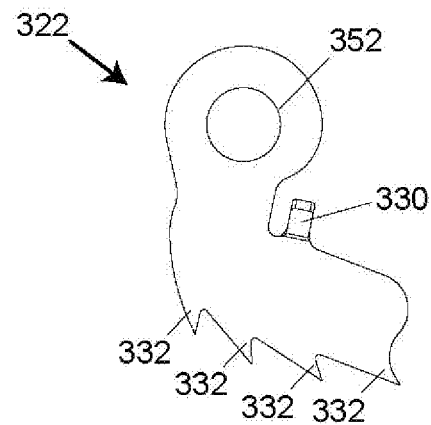
FIG. 64 shows a small anti-kickback pawl.
Figure 65:
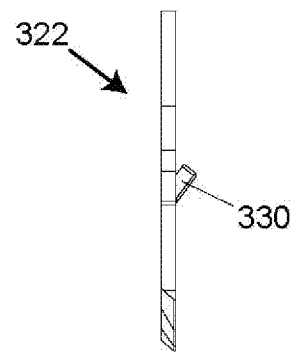
FIG. 65 shows another view of a small anti-kickback pawl.
Figure 66:
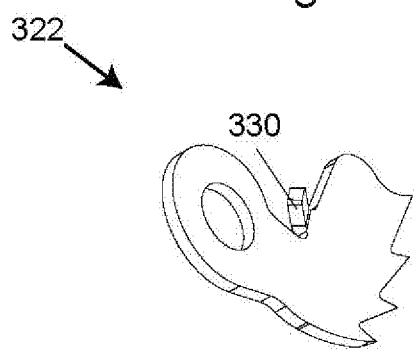
FIG. 66 shows still another view of a small anti-kickback pawl.
Figure 67:
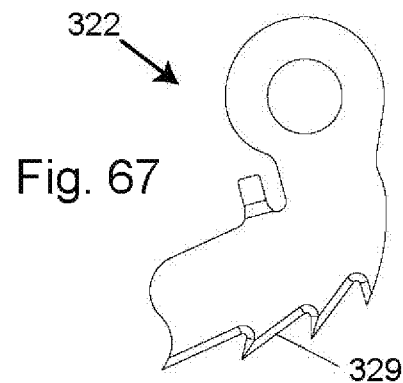
FIG. 67 shows a side view of a small anti-kickback pawl.

While the large anti-kickback pawls work well for situations where the top of the blade is at least about half an inch above the surface of the workpiece, small anti-kickback pawls are included to more effectively catch workpieces that are less than about half an inch below the top of the blade. FIGS. 64 through 67 show a small anti-kickback pawl 322 intended for use on the right side of the splitter. A small anti-kickback pawl for use on the left side of the splitter would be a mirror image of the right-side small anti-kickback pawl. As shown in FIGS. 64 and 65, the small anti-kickback pawl is made of a shorter, flat, curved metal piece that has a small rectangular protrusion 330 bent outward at a forward angle from the top edge. Notches are cut along the lower edge of the bottom portion to create four sharp, pointed tips 332 that are spaced at an increasing distance front to back along lines drawn from tip to tip. Like the large anti-kickback pawls, a chamfer 329 is cut at about 45 degrees along the bottom edge of the pawl to make the tips 328 even sharper. Unlike the large anti-kickback pawls, in the illustrated embodiment the chamfer is cut along the inside edge, closest to the splitter, of both the right and left small pawls, as can be seen in FIG. 63, although the chamfer could be like the chamfer on the large anti-kickback pawls. The chamfer is cut along the inside of the small pawls so that the sharp tips are farthest away from the blade and thus are better able to grab the workpiece. If the sharp tips were closer to the blade they may fall into an area where the kerf of the blade has cut away the workpiece material and there is no material to grab. The sharp tips are spaced so that ideally only one tip contacts the workpiece at a time so the load is not spread out over many tips as this would decrease the tips ability to grab the workpiece. The sharp tips are angled in such a way that they do not interfere with a workpiece as it moves forward, but the tips grab a workpiece that is moving back towards the front of the blade.

Figure 68:
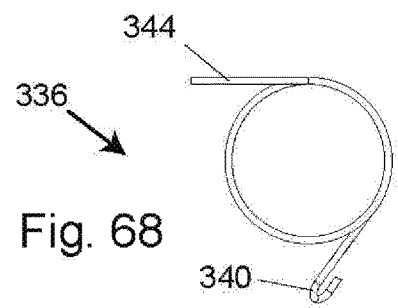
FIG. 68 shows a spring for use with an anti-kickback pawl.
Figure 69:
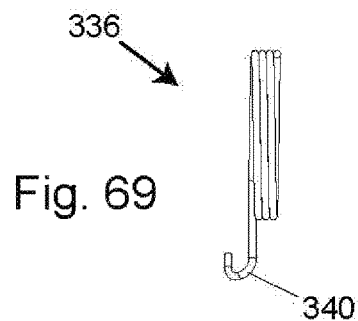
FIG. 69 shows another view of a spring.
Figure 70:
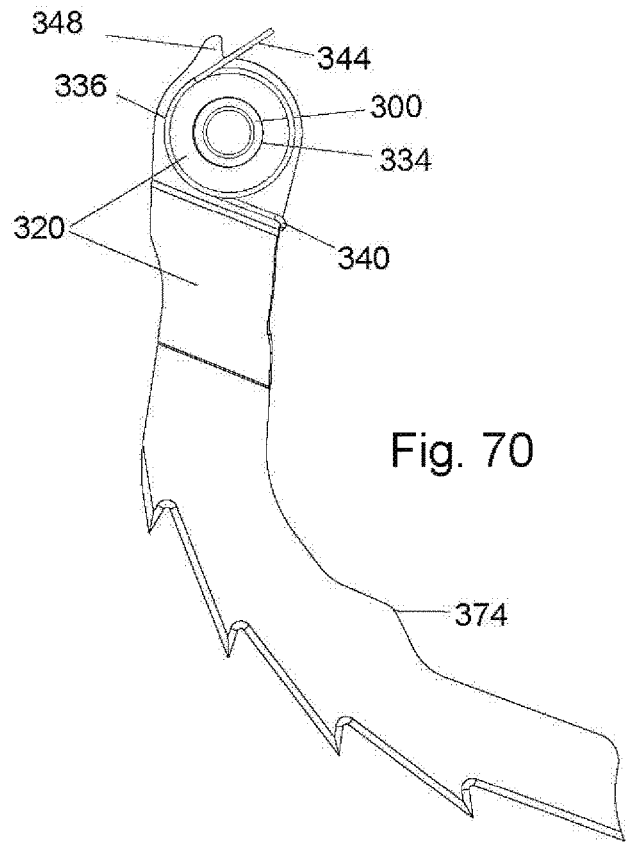
FIG. 70 shows an anti-kickback pawl with a spring.

The anti-kickback pawls are mounted to the splitter by bolt 266, as shown in FIG. 37. A hole 334 in one of the large anti-kickback pawls 320 fits over the outer smaller diameter section 300 of one of the bushings 298. A coil spring 336, shown in FIGS. 68 and 69, is placed over the raised circular area 294 on the dust shroud. One end 340 of spring 336 is curled and hooks onto the back edge of the large anti-kickback pawl as shown in FIGS. 48 and 70. The other straight end 344 of spring 336 tucks under and presses up against the underside 346 of the dust port, as shown in FIG. 48. A pawl stop 348, consisting of a small protrusion extending upwards from the top edge of the large pawl, abuts the edge 350 of the bottom of the dust port when the large anti-kickback pawls are not rotated back, as shown in FIG. 48. Pawl stop 348 stops the large anti-kickback pawl from pivoting too far forward under the action of the spring so that the spring remains in tension and the sharp tips are held at an angle effective in grabbing the surface of the workpiece. The spring is loose enough to allow the anti-kickback pawl to pivot to the back as a workpiece moves forward underneath it, but strong enough to pull the anti-kickback pawl forward again once the workpiece clears the pawl.

Figure 74:
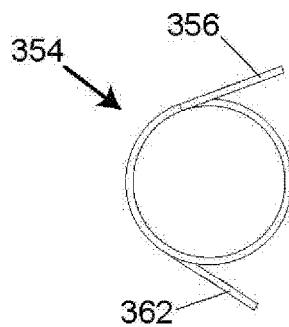
FIG. 74 shows another spring for use with an anti-kickback pawl.
Figure 75:
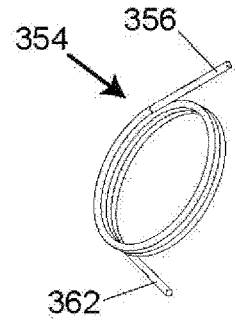
FIG. 75 shows another view of a spring.
Figure 76:
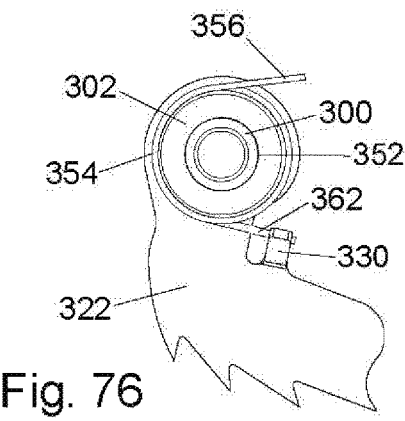
FIG. 76 shows a small anti-kickback pawl with a spring.

A hole 352 in one of the small anti-kickback pawls 322 fits over the inner smaller diameter section 300 of bushing 298. A coiled spring 354, shown in FIGS. 74 and 75, is loosely wound around the larger diameter middle section 302 of each bushing 298. One straight end 356 of spring 354 tucks under and presses against the underside 346 of the dust port. The other straight end 362 of spring 354 is pressed back behind the small rectangular protrusion 330 in the small anti-kickback pawl, as shown in FIG. 76, where tension holds it in place. A pawl stop, which consists of a small peg 370 pressed into a small hole 372 in the splitter such that it protrudes out on either side of the splitter, as shown in FIGS. 37 and 48, stops the small anti-kickback pawl from pivoting too far forward under the action of the spring so that the spring remains in tension and the sharp tips are held at an effective angle to grab the workpiece. Peg 370 is attached to the splitter and the splitter is securely mounted in the saw in order to make peg 370 strong so it can stop the small pawls from rotating too far towards the user in a kickback situation where the small pawls may dig deep into a workpiece and tend to go over center, or past the pivot point.

The large anti-kickback pawls can be disabled by rotating them upward until a bump 374 along the top edge of the lower portion of the anti-kickback pawl hits a stop on the dust port formed by an outward extension on one of the pivot joint ridges 376 that is nearly horizontal and slightly above the middle of the dust port, as shown in FIG. 48. Once rotated upward, the anti-kickback pawl can be pressed toward the dust port and guided into a catch 378 that extends out from the dust port and which holds the anti-kickback pawl along the side of the dust port. Catch 378 has a small, vertically oriented, ear-shaped tip 380 which is flat on the inside surface against which the anti-kickback pawl presses. Two support ridges 382, shown in FIG. 39, begin from behind the middle of the tip and extend down and to the rear of the dust port along the side of the dust port. A triangular support beam 384 extends inwards from the rear portion of the inside surface of the tip to meet the beam extending inward from the other dust port half and give support to the catches. The triangular beam is hollow, shown at 386 in FIG. 50, to keep the walls about the same thickness as the rest of the dust port. This helps to minimize warping distortions that may occur when areas of different thicknesses cool in the manufacturing of the molded plastic dust port.

Figure 40:
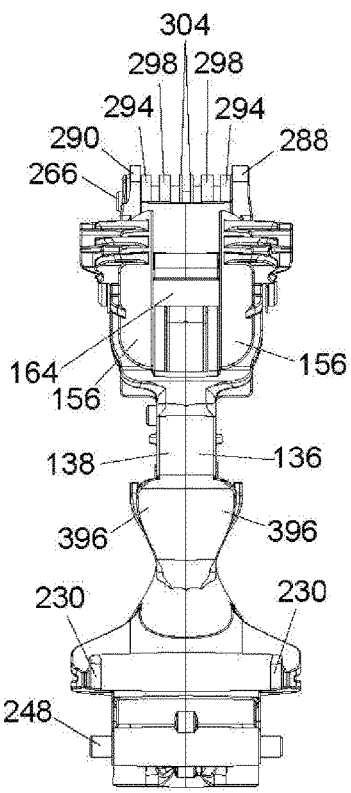
FIG. 40 shows a top view of the dust port of the blade guard.

A pawl guard 388 shaped like a large triangular structure oriented lengthwise along the length of the dust port, rises above the top of the dust port and straddles catches 378 such that the peak of the triangular structure is just slightly more forward than the front of the catches, as shown in FIG. 38. The pawl guard is formed by two halves, one on each dust port half, that align together lengthwise with tongue and groove edges to help with alignment of the two dust port halves. As shown in FIG. 47, the pawl guard consists of a front surface 390 that runs from the front bottom corner of the triangle to the peak, a rear surface 392 that runs from the peak to the rear bottom corner of the triangle, and an outward facing side surface 394 that runs along the outside edges of the front and rear surfaces and is perpendicular to the front and rear surfaces. Material is removed from the center area of the pawl guard so that a large, generally triangular hole runs through the middle of the pawl guard. The purpose of the pawl guard is to provide some protection to the user of the saw when rotating the large anti-kickback pawls into their catches—the guard protects the user from the sharp tips on the end of the anti-kickback pawls. The rear surface of the pawl guard 388 has flanges 396 that extend out to each side and are positioned so that they run along and above the arcs traveled by the sharp tip of each large anti-kickback pawl as the pawls are rotated into their catches. The flanges extend out the farthest at the top of the pawl guard and gradually taper inward towards the bottom, as best seen in FIG. 40. Again, to minimize warping distortions that may occur when areas of different thicknesses cool in the manufacturing of the molded plastic dust port, the front, rear and side surfaces have about the same thickness which leaves a hollow area within the pawl guard as shown at 398 in FIG. 50.

Figure 81:
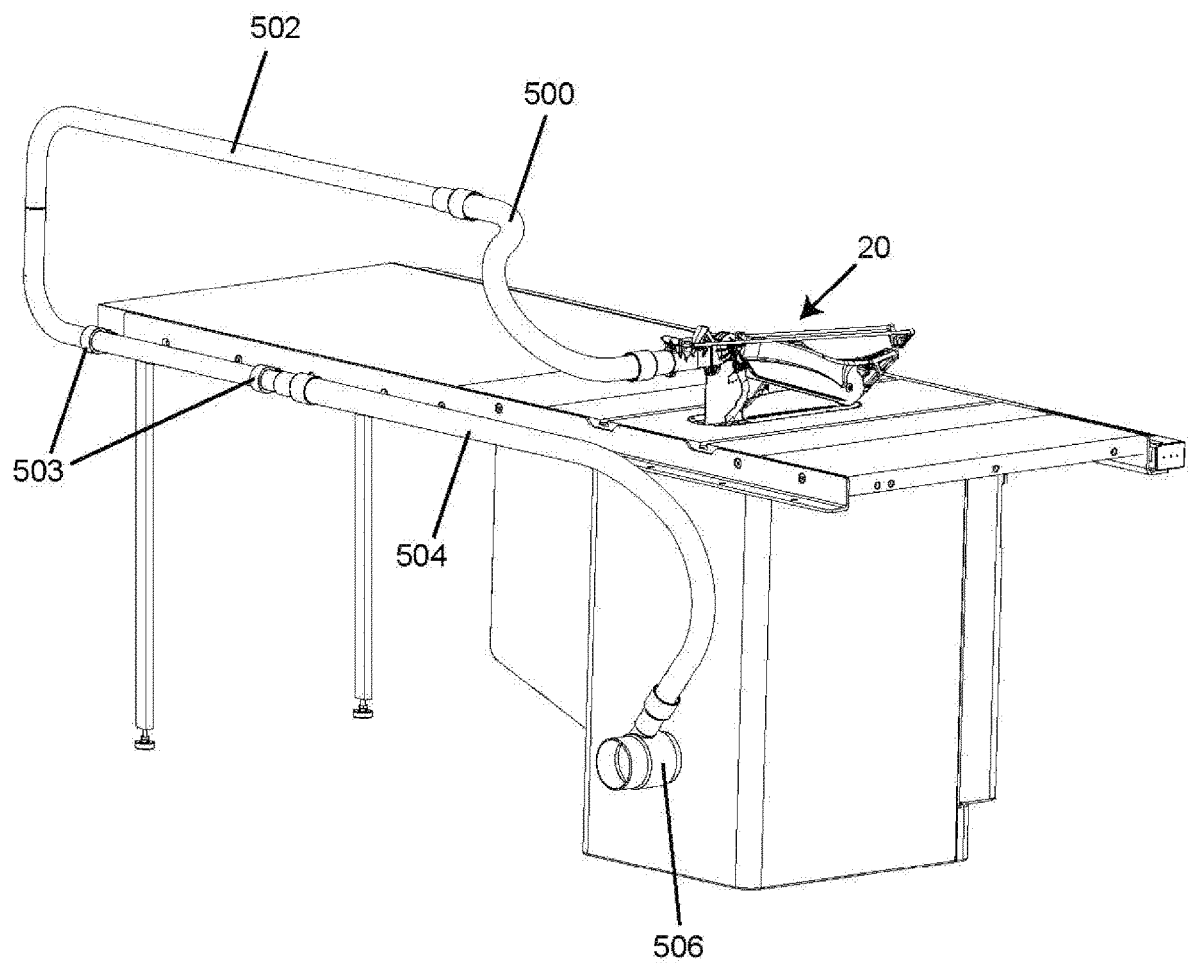
FIG. 81 shows a blade guard connected to a dust collection hose and conduit.

FIG. 81 shows blade guard 20 connected to a flexible hose 500, which in turn, is connected to conduit 502 that extends above the saw to provide clearance for workpieces pushed past the blade. In the depicted embodiment, conduit 502 is a bent, rigid metal pipe. The conduit is supported by mounts 503 which attach to the saw or to a rail along the back of an extension table attached to the saw. A second hose 504 connects conduit 502 to a dust collection port 506 on the table saw, which in turn can be collected to a vacuum or some other dust collection system.

Figure 82:
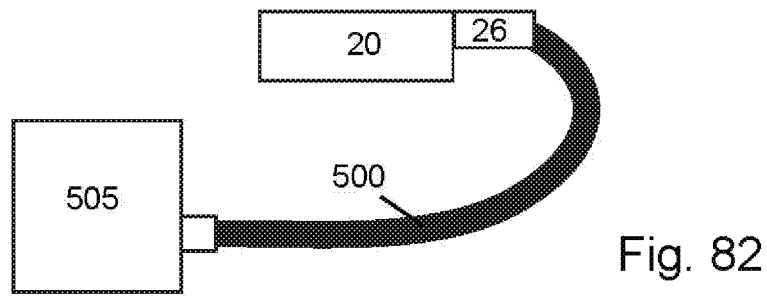
FIG. 82 is a schematic drawing of a blade guard connected to a vacuum.
Figure 83:
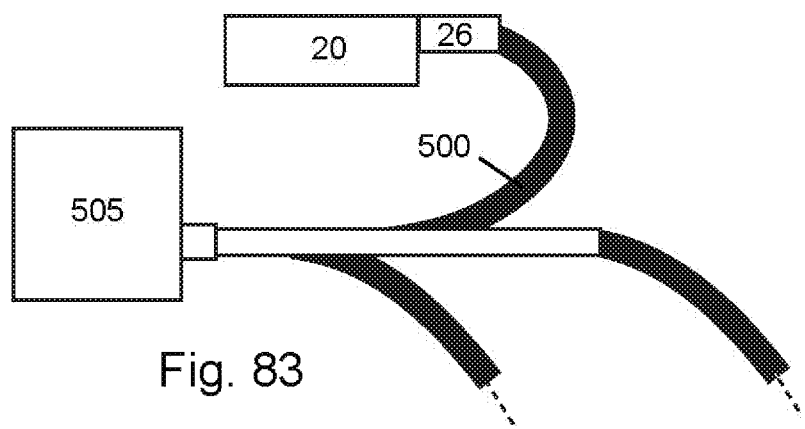
FIG. 83 is another schematic drawing of a blade guard connected to a vacuum system.
Figure 84:
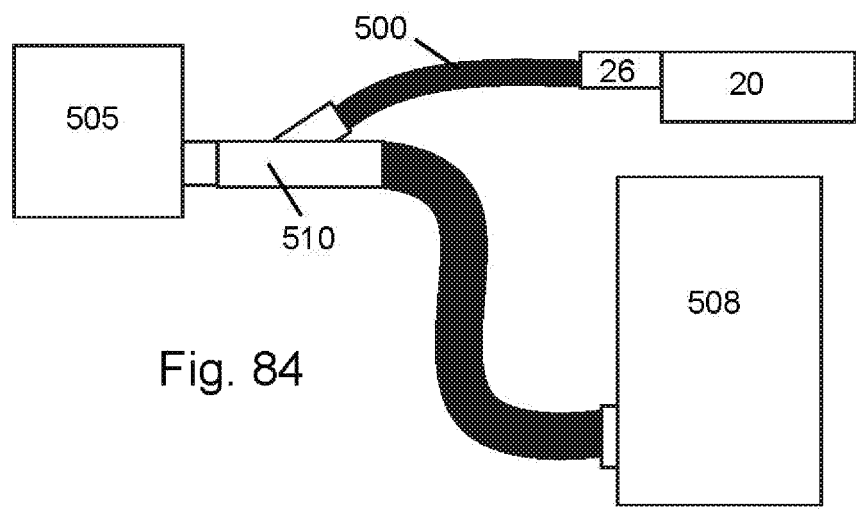
FIG. 84 is a schematic drawing of a vacuum system connected to a blade guard and a table saw.

FIG. 82 is a schematic representation of the blade guard 20 incorporated into a dust collection system. One end of a hose 500 is connected to the dust port 26 of the blade guard and the other end is connected to a vacuum 505. Alternatively, as shown in FIG. 83, hose 500 may be connected to a conduit that connects to the vacuum system and to which one or more other hoses may also be attached. A larger hose connected to saw 508 may also be connected to the vacuum system along with hose 500 through a splitter 510, as shown in FIG. 84.

The invention claimed is:

1. A dust collection system for use on a power tool with a blade, the system comprising:
   a guard configured to at least partially shield the blade, and further configured so that a workpiece traveling under the guard can move the guard, and
   dust collection means for collecting dust generated by the power tool while allowing the guard to move freely, where the dust collection means includes a dust port rigidly attached to a splitter.

2. A dust collection system for use on a power tool with a blade, the system comprising:
   a guard portion configured to at least partially shield the blade, and further configured so that a workpiece traveling under the guard portion can move the guard portion,
   a dust collection channel associated with the guard portion, where the dust collection channel has an outlet, and where the dust collection channel is configured to channel dust generated by the power tool to the outlet, a vacuum,
a conduit connecting the vacuum to the outlet, and
a splitter,
where the conduit is supported by the splitter so that the conduit does not hinder the movement of the guard portion.

3. The dust collection system of claim 2, where the conduit supported by the splitter is supported so that it does not move when a workpiece moves the guard portion.

4. A blade guard for use on a power tool with a blade, the guard comprising:
a shroud configured to at least partially shield the blade, where the shroud has a channel through which dust may travel;
a splitter:
a dust port fixed to the splitter, where the dust port includes a channel through which dust may travel, an inlet and an outlet, where the outlet is configured to connect to a dust collection system; and
a joint connecting the shroud to the dust port, where the joint is configured so that the shroud can move without the dust port moving, and where the joint is further configured so that the channel in the shroud operably connects with the channel in the dust port;
where the dust port is fixed to the splitter so that the splitter supports the weight of the dust collection system connected to the outlet of the dust port.

* * * * *